United States Patent [19]

O'Connell et al.

[11] Patent Number: 5,764,808
[45] Date of Patent: Jun. 9, 1998

US005764808A

[54] METHOD AND DEVICE FOR COMPACT REPRESENTATION OF A DISCRETE REGION CONTOUR

[75] Inventors: Kevin Joseph O'Connell, Palatine; Damon Lee Tull, Evanston, both of Ill.

[73] Assignee: Motorola, Inc., Schaumburg, Ill.

[21] Appl. No.: 548,630

[22] Filed: Oct. 26, 1995

[51] Int. Cl.$^6$ .................................................. G06K 9/00
[52] U.S. Cl. ............................................ 382/242; 382/243
[58] Field of Search ..................................... 382/232, 233, 382/235, 236, 239, 241, 242, 243, 244, 248, 251, 209, 234, 240, 245, 246, 250, 252, 253, 276, 197; 358/430, 432; 348/135, 416

[56] References Cited

U.S. PATENT DOCUMENTS

| 4,493,105 | 1/1985 | Beall et al. ....................... 382/21 |
|---|---|---|
| 4,817,187 | 3/1989 | Lien ................................. 382/243 |
| 5,295,201 | 3/1994 | Yokohama ........................ 382/48 |
| 5,303,313 | 4/1994 | Mark et al. ...................... 382/243 |

OTHER PUBLICATIONS

J.L. Kim, J. H. Kim, H.M. Jung, and B.U. Lee "Contour Coding Using DST (discrete sine transform)". ISO/IEC JTC1/SC29/WG11 (MPEG) committee document MPEG 95/053 Lausanene, Switzerland, Mar. 1995, no page no.

Konstantinides. "An Architecture for Lossy Compression of Waveforms using Piecewise Linear Approximation", IEE Transactions on Signal Processing vol. 42, No. 9 Sep. 1994. (No page no.).

Choo, H. Freeman, "An Efficient Technique for Compressing Chain-Coded Line Drawing Images", IEEE, pp. 717-720, 1992 (No place of publication).

*Primary Examiner*—Leo Boudreau
*Assistant Examiner*—Bijan Tadayon
*Attorney, Agent, or Firm*—Darleen J. Stockley

[57] ABSTRACT

A method (900, 1000) and device (100, 600) are provided for encoding and/or decoding a compact representation of a discrete region contour for the purposes of image and video compression. The compact representation described provides bitstream scalability so that progressively larger subsets of the compact representation can be used to provide progressive better quality in the approximate reconstruction of the discrete region contours. The resulting device and method provide for coding of shape information within object-based and region-based image and video compression systems.

67 Claims, 6 Drawing Sheets

METHOD AND DEVICE FOR COMPACT REPRESENTATION OF A DISCRETE REGION CONTOUR

FIELD OF THE INVENTION

The present invention relates generally to image and video coding, and more particularly to compression of discrete region contours in region-based and object-based image and video codecs.

BACKGROUND OF THE INVENTION

In the area of image and video coding, there are systems that require an ability to represent irregularly-shaped objects or regions within a still image or a video sequence. Most techniques for irregular-shaped region representation involve three key components: coding of shape information (i.e., the contour of the region), coding of texture information (i.e., the appearance of the area within the region contour), and in video sequences coding of motion information (i.e., the way in which the region moves in time). It is very difficult to represent an irregularly-shaped object or region with a small number of bits, while preserving acceptable quality. In particular, the shape information representation can consume a significant portion of the total number of bits for the region representation or undergo severe geometric distortion.

As most image and video coding systems involve manipulation of digitally sampled pictures, the object or region shape information is also generally digitally sampled and will hereafter be referred to as a discrete region contour, or DRC. The characteristics of the DRC may vary greatly from one DRC to another DRC, and may be non-stationary. These characteristics include the DRC's size (portion of the picture), global detail (average curvature), and local detail (instantaneous curvature or jaggedness). These characteristics variations pose an additional challenge to representation of a discrete region contour.

Many DRC coding methods provide a lossless compression of the shape information, but require numerous bits, preventing access over low bit-rate access-channels or severely compromising the quality of the other two key components (texture and/or motion representation). Other DRC coding methods use fewer bits by using lossy compression techniques which introduce severe visible geometric distortions.

Another aspect of the problem is the ability to extract a useful representation of the DRC from a subset of the compressed data stream. This ability, usually referred to as "bitstream scalability", allows retrieval of the DRC over low bit-rate access-channels and decoding on platforms with limited compute resources.

The primary prior art represents the DRC by a combination of polygonal approximation and contour error data. For each DRC, an ordered set of vertices are determined which define a polygonal approximation of the contour. The absolute address of each vertex is then coded. The difference between the original contour and the polygon, i.e., the contour error, is then represented by a 1-dimensional Discrete Sine Transform (DST) of the difference data along each line segment of the polygon. This approach is limited in its ability to select good vertices, does not provide efficient coding of the vertex information, and is limited to two levels of scalability.

Prior art specifically addressing the vertex selection method produces a piecewise linear approximation of a one-dimensional signal for the purpose of scan-line image compression. This method does not address how to produce the approximation for a two dimensional function.

Prior art specifically addressing the vertex coding method uses an octant-based representation of the vertices. This method uses a fixed dynamic range for the relative locations of the vertices and does not exploit the distribution of the vertices within the dynamic range.

Prior art also specifically addresses the contour-error coding method. It provides only one layer of contour-error coding, bringing the number of layers for the overall approach to only two. To support retrieval of information over a wide range of access-channels, more than two levels of scalability are needed.

Thus, there exists a need for a method and device for a compact representation of a discrete region contour which provides at least one of: improved vertex selection, improved vertex coding, and finer granularity of bitstream scalability, to achieve the desired reconstructed quality at a targeted bit allocation.

DETAILED DESCRIPTION OF A PREFERRED EMBODIMENT

The present invention provides a device and method for encoding/decoding a compact representation of a discrete region contour. A preferred embodiment of the encoding process determines an ordered set of quantized vertices which approximates the discrete region contour by using a two-dimensional visibility-based method of selecting a minimal set of vertices that meet a predetermined error tolerance, compactly represents the ordered set of quantized vertices by adapting the representation method to the characteristics of a particular discrete region contour, and compactly represents a plurality of contour-error layers which provides a high degree of bitstream scalability. A preferred embodiment of the decoding process receives a serial bitstream from the encoding process and produces a base-layer approximate reconstruction of the discrete region contour and optionally produces enhanced approximate reconstructions by decoding one or more of the plurality of contour-error layers.

Figure 1:
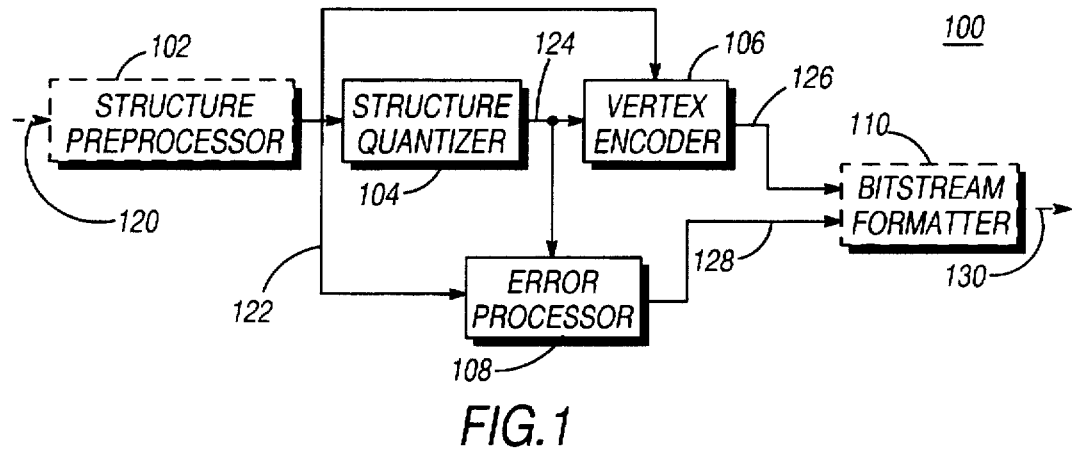
FIG. 1 is a block diagram of a preferred embodiment of an encoding device in accordance with the present invention.

The present invention is more fully described with reference to FIGS. 1–10. FIG. 1, numeral 100, is a block diagram of one preferred embodiment of an encoding device in accordance with the present invention. A region from a picture which has been segmented into a plurality of regions (120) is received by a structure pre-processor (102) which detects the edges of regions (120), performs a non-linear filtering on the detected edges to guarantee a one-pixel-width closed-contour, and produces a discrete region contour (DRC) (122). A structure quantizer (104) determines an ordered set of quantized vertices (124) which define a piecewise linear approximation of the DRC. The vertex encoder (106) produces a compact vertex representation (126) of the ordered set of quantized vertices (124), optionally using the DRC. The error processor (108) produces a multi-layered compact contour-error representation for predictive scalable reconstruction (128) of the DRC based on the ordered set of quantized vertices (124). The bitstream formatter (110) simply multiplexes the compact vertex representation (126) and the multi-layered compact contour-error representation for predictive scalable reconstruction (128) into a format to facilitate bitstream scalability.

The present invention includes any embodiment which uses at least one of the structure quantizer (104), the vertex encoder (106), and the error processor (108). A preferred embodiment is to use the structure quantizer (104), the vertex encoder (106), and the error processor (108) together, as shown in FIG. 1. The invention of (104), (106), and (108) is described with greater particularity below. Where selected, a structure preprocessor (102) may be coupled immediately before the structure quantizer (104). In addition, where selected, a bitstream formatter (110) may be coupled to the vertex encoder (106) and to the error processor (108).

Figure 2:
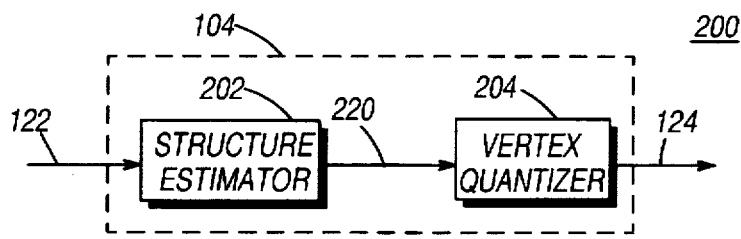
FIG. 2 is a block diagram of a preferred embodiment of the structure quantizer of FIG. 1, shown with greater particularity, in accordance with the present invention.

FIG. 2, numeral 200, is a block diagram of one preferred embodiment of the structure quantizer (104), in accordance with the present invention. The structure quantizer (104) includes a structure estimator (202), coupled to receive input, for example, from a structure preprocessor (102), and a vertex quantizer (204) coupled to the structure estimator (202). The structure estimator (202) uses a two-dimensional visibility-based piecewise linear approximation to determine an ordered set of vertices (220) on the DRC (122) which defines an approximation of the DRC (122). The vertex quantizer (204) converts the ordered set of vertices (220) into more coarse locations, resulting in the ordered set of quantized vertices (124).

The structure estimator (202) sets an error tolerance range perpendicular to a tangent at each point in the DRC (122), where the error tolerance range has a preselected upper error bound and a preselected lower error bound. An initial starting point is selected and a view from the starting point is initialized to be between the upper error bound and the lower error bound of a next point in the DRC. In repeated iterations for next points in the DRC (122), the view is narrowed based on the next point's upper error bound and lower error bound. The repeated iterations are suspended when the next point's error tolerance range is entirely outside the view. A vertex is then generated at a current point having a error tolerance range that is at least partially inside the view. The starting point is then set to be the current point and the repeated iterations are continued. The repeated iterations are terminated when the next point is the initial starting point.

A preferred implementation of the structure estimator (202) is setting the upper error bound and the lower error bound an equal distance from a point in the DRC (122) and adapting this distance based on local features of the DRC (122). An example mechanism for performing this adaptation is setting a maximum distance of 10 pixels, setting a minimum distance of 2 pixels, determining a maximum curvature and a minimum curvature of points in the DRC (122), determining a curvature at a given point in the DRC (122), and then setting the distance at the given point according to: distance=(minimum distance)*p+(maximum distance)*(1−p) where p=(curvature at the given point)/(maximum curvature −minimum curvature).

Furthermore, the preferred implementation of the structure estimator (202) selects the given point with highest curvature as the initial starting point.

Implementation of the vertex quantizer (204) depends on the resolution (i.e., the sampling rate) of the DRC (122) and the targeted quality of the compact vertex representation (126). An example implementation for a region from a 720 by 480 pixel picture and for a reconstruction quality appropriate for a 174 by 120 pixel picture is rounding each vertex location in the ordered set of vertices (220) to the nearest multiple of four location both horizontally and vertically.

Figure 3:
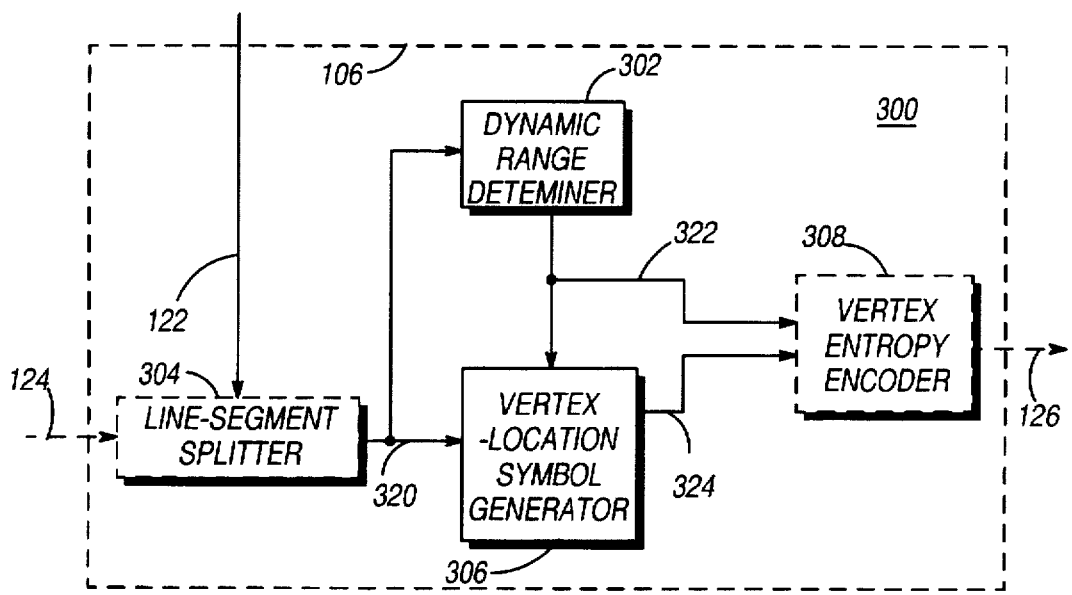
FIG. 3 is a block diagram of a preferred embodiment of the vertex encoder of FIG. 1, shown with greater particularity, which produces an object-adaptive compact vertex representation, in accordance with the present invention.

FIG. 3, numeral 300, is a block diagram of one preferred embodiment of the vertex encoder device (106) which produces the object-adaptive compact vertex representation, in accordance with the present invention. The dynamic range determiner (302) analyzes the ordered set of quantized vertices (124) to determine a maximum horizontal displacement magnitude between adjacent vertices and a maximum vertical displacement magnitude between adjacent vertices. In the preferred embodiment, the larger of the maximum horizontal displacement magnitude and the maximum vertical displacement magnitude is chosen to be a relative-location maximum. In an alternative embodiment, these two maximums are both processed separately. A predetermined table of vertex relative-location dynamic ranges is searched to find a smallest vertex relative-location dynamic range which accommodates the relative-location maximum. The dynamic range determiner (302) then outputs a vertex relative-location dynamic range indicator corresponding to the smallest vertex relative-location dynamic range selected from the predetermined table of vertex relative-location dynamic ranges. A preferred embodiment of the predetermined table of vertex relative-location dynamic ranges contains 8 entries whose dynamic ranges are powers of two minus one, specifically dynamic ranges having relative-location maximums of 1, 3, 7, 15, 31, 63, 127, and 255.

Optionally, the line-segment splitter (304) analyzes the ordered set of quantized vertices (124) to determine whether adding vertices between widely-spaced adjacent vertices, would decrease the number of bits needed to represent the ordered set of quantized vertices (124). If splitting occurs, then the ordered set of quantized vertices is modified. In general, splitting leads to fewer bits when there are relatively few large relative-locations.

In the preferred embodiment the line-segment splitter (304) utilizes a splitting rule: if $M/N<=1/(1+E)$ then split, where N is a current total number of vertices in the ordered set of quantized vertices, M is a current number of vertices whose relative horizontal locations or relative vertical locations are larger than a next smaller entry in the predetermined table of vertex relative-location dynamic ranges, and E is an expected number of bits/vertex if the next smaller entry is used.

Furthermore, in the preferred embodiment, when splitting occurs, a quantized vertex along the discrete region contour is added for each of the M vertices, immediately prior to each of the M vertices in the order set of quantized vertices, the values of N, M, and E are updated, and then the splitting rule is repeated until the rule indicates not to split further.

The vertex-location symbol generator (306), coupled to the dynamic range determiner (302) and where selected, to the line segment splitter (304), produces an ordered set of vertex-location symbols (324) that represent the ordered set of quantized vertices (320) taking advantage of implications of the vertex relative-location dynamic range indicator (322). Each vertex is represented by an octant vertex representation. For each vertex a relative location of the vertex relative to a previous vertex in the ordered set of quantized vertices (320) is calculated and the octant of the relative location is determined. A larger component and a smaller component may be determined from knowing the octant. As a result, the ordered set of vertex-location symbols (324) contains for each vertex an octant symbol, a larger component symbol, and a smaller component symbol.

The vertex entropy encoder (308), coupled to the dynamic range determiner (302) and the vertex location symbol generator (306), produces an object-adaptive compact vertex representation (126), efficiently representing the vertex relative-location dynamic range indicator (322) and the ordered set of vertex-location symbols (324), utilizing a predetermined entropy encoding method. The vertex entropy encoder (308) takes advantage of a fact that the vertex relative-location dynamic range indicator (322) in association with the predetermined table of vertex relative-location dynamic ranges determines a count of valid values for the larger component symbol. Similarly, the vertex entropy encoder (308) takes advantage of a fact that the larger component symbol value determines a count of valid values for the smaller component symbol. Typical entropy encoding methods which may be used include fixed-length codes, huffman codes, and arithmetic codes. The preferred embodiment uses arithmetic codes.

Figure 4:
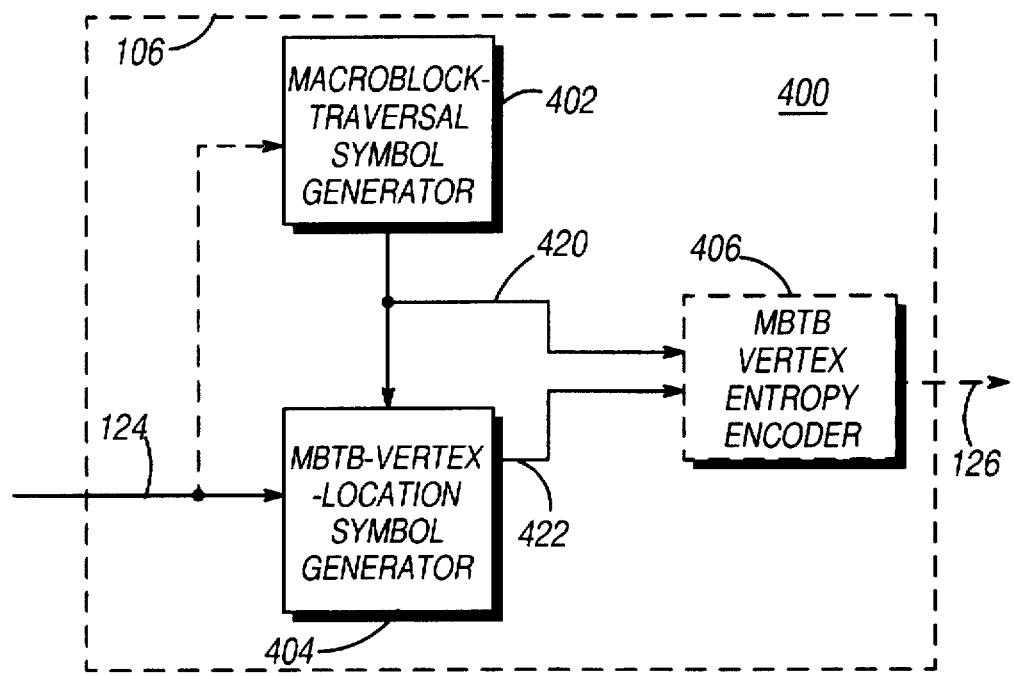
FIG. 4 is a block diagram of a preferred embodiment of the vertex encoder of FIG. 1, shown with greater particularity, which produces a two-layer macroblock-traversal compact vertex representation, in accordance with the present invention.

FIG. 4, numeral 400, is a block diagram of one preferred embodiment of the vertex encoder device (106) which produces the two-layer macroblock-traversal compact vertex representation, in accordance with the present invention. The macroblock-traversal symbol generator (402) divides the picture into a plurality of macroblocks, determines an ordered list of macroblocks by traversing the DRC, and generates an ordered set of macroblock-traversal symbols (420). Alternatively, the ordered list of macroblocks may be determined by traversing the line-segments connecting the ordered set of quantized vertices (124). Chain-coding techniques that have been used to code strings of adjacent pixels, may be used to code the ordered list of macroblocks. The preferred embodiment uses a differential chain-coding of the ordered list of macroblocks and macroblocks having a size of 16 by 16 pixels.

The macroblock-traversal-based (MBTB)-vertex location symbol generator (404) uses the ordered set of quantized vertices (124) and the output from the macroblock-traversal symbol generator (402) to initialize a current macroblock to be the first macroblock of the ordered list of macroblocks. If there is any vertex from the ordered set of quantized vertices within the current macroblock, then a vertex__in__ macroblock symbol, a horizontal vertex location symbol, and a vertical vertex location symbol is generated. Otherwise, a vertex__not__in__macroblock symbol is generated, the current macroblock is set to be the next macroblock in the ordered list of macroblocks, and this step is repeated until a first vertex has been found.

For each subsequent vertex in the ordered set of quantized vertices, if the vertex is within the current macroblock, then a vertex__in__macroblock symbol, a horizontal vertex location symbol, and a vertical vertex location symbol is generated.

Otherwise, a vertex__not__in__macroblock symbol is generated, the current macroblock is set to be the next macroblock in the ordered list of macroblocks, and this step is repeated until the vertex has been found. The end result is an ordered set of MBTB vertex-location symbols (422).

The MBTB vertex entropy encoder (406), coupled to the macroblock-traversal symbol generator (402) and to the MBTB-vertex location symbol generator (404), produces a two-layer MBTB compact vertex representation (126), efficiently representing the ordered set of macroblock-traversal symbols (420) and the ordered set of MBTB vertex-location symbols (422), utilizing a predetermined entropy encoding method. Typical entropy encoding methods which may be used include fixed-length codes, Huffman codes, and arithmetic codes. The preferred embodiment uses an arithmetic code for the differentially chain-coded symbols in the ordered set of macroblock-traversal symbols (420), the vertex__not__in__macroblock symbol, and the vertex__in__ macroblock symbol. Fixed-length codes are used for the horizontal vertex location symbol and the vertical vertex location symbol.

Figure 5:
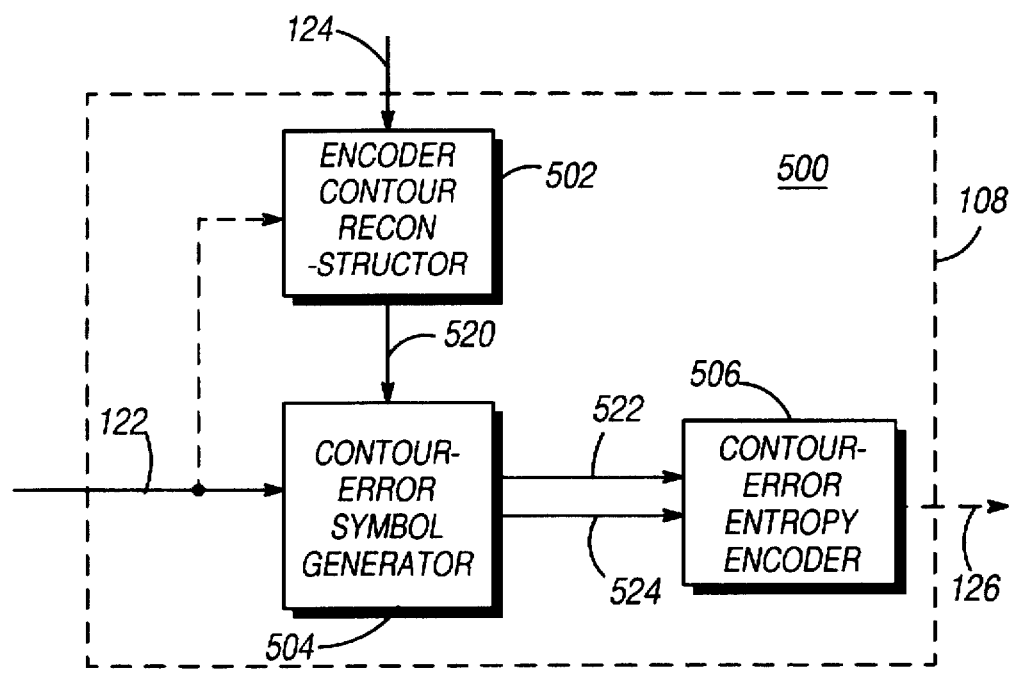
FIG. 5 is a block diagram of a preferred embodiment of the error processor of FIG. 1, shown with greater particularity, in accordance with the present invention.

FIG. 5, numeral 500, is a block diagram of one preferred embodiment of the error processor device (108), in accordance with the present invention. The encoder contour reconstructor (502) produces a plurality of approximations of the DRC (520) based on the ordered set of quantized vertices (124). The contour-error symbol generator (504), coupled to receive characteristics of a selected DRC (122) and to the encoder contour reconstructor (502), selects one of the plurality of approximations of the discrete region contour (520) which forms a best prediction of the DRC, signals that selection by producing a contour approximation method indicator (522), samples the difference between the DRC and the approximation along the approximation curve, and codes the samples into a plurality of error symbol layers (524).

Provision of a plurality of approximations using different techniques allows an approximation method which best matches the characteristics of the given DRC (122) to be used. For example, polygonal shapes (e.g., buildings, block letters, tables) are best approximated by piecewise linear approximation with vertices at the points of high curvature, while curved shapes (e.g., faces, balls) may be better approximated polynomial splines. In the preferred embodiment, two approximation methods are used: piecewise linear approximation and polynomial splines. The criteria for selection of one of the plurality of approximations of the DRC is a minimum distortion relative to the DRC. In the preferred embodiment the minimum distortion relative to the DRC is a summation of area between the DRC and the one of the plurality of approximations of the DRC.

Furthermore, in the preferred embodiment, the plurality of error symbol layers (524) is comprised of three layers. Between each pair of adjacent vertices in the ordered set of quantized vertices a predetermined number of samples, e.g., 32, of the DRC are taken at equal spacing along the curve provided by the one of the plurality of approximations of the DRC (122), unless the curve has a length less than a predetermined threshold, e.g., 16 pixels, in which case the predetermined number of samples is proportionally reduced. The three layers provide 3 levels of bitstream scalability. In the preferred embodiment, a first layer uses a Discrete Sine Transform (DST) to code 8 samples between each pair of adjacent vertices, a second layer is predicted from the first layer and uses the DST to code 16 samples between each pair of adjacent vertices, and a third layer is predicted from the second layer and uses the DST to code 32 samples between each pair of adjacent vertices.

The contour-error entropy encoder (506), coupled to the contour error symbol generator (504), produces a multi-layered compact contour-error representation for predictive scalable reconstruction (128), efficiently representing the contour approximation method indicator (522) and the plurality of error symbol layers (524), utilizing a predetermined entropy encoding method. Typical entropy encoding methods which may be used include fixed-length codes, huffman codes, and arithmetic codes. The preferred embodiment uses arithmetic codes.

Figure 6:
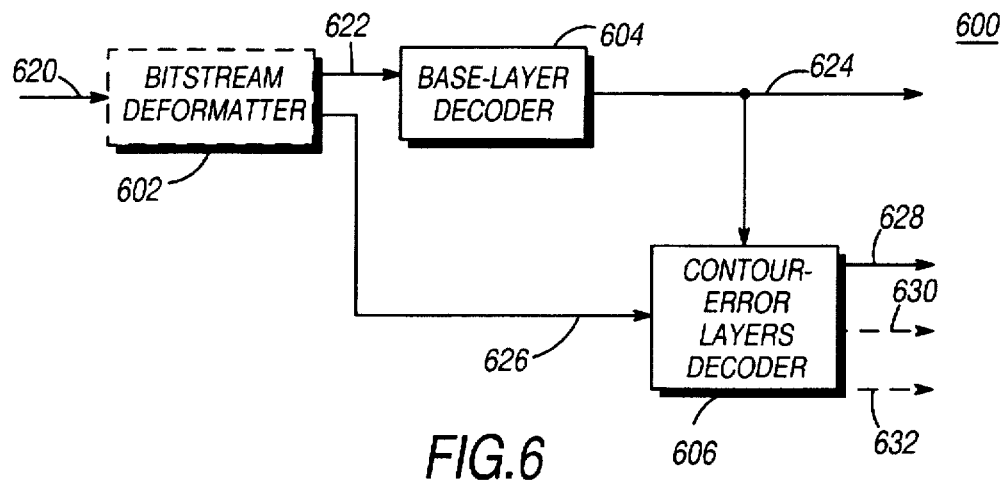
FIG. 6 is a block diagram of a preferred embodiment of a decoding device in accordance with the present invention.

FIG. 6, numeral 600, is a block diagram of one preferred embodiment of a decoding device in accordance with the present invention. Where selected, a bitstream deformatter (602) separates a serial bitstream of vertex representation and multi-layered contour-error representation information (620) into a compact vertex representation (622) and a subset of the multi-layered compact contour-error representation (626). The base-layer decoder (604) decodes the compact vertex representation (622) into a base-layer approximate reconstruction of the discrete region contour (624). The contour-error layers decoder (606), coupled to the base layer decoder (604) and, where a bitstream deformatter (602) is utilized, to receive a subset of the multi-layered compact contour-error representation (626), combines the base-layer approximate reconstruction of the discrete region contour (624) with a subset of the multi-layered compact contour-error representation (626) to create a first enhanced approximate reconstruction of the DRC (628). The contour-error layers decoder (606) may receive a subset of the multi-layered compact contour-error representation (626) which contains additional information needed to produce a second enhanced approximate reconstruction of the DRC (630) and possibly a third enhanced approximate reconstruction of the DRC (632), each with progressively better quality approximation of the DRC.

While the present invention includes any embodiment which uses at least one of the base-layer decoder (604) and the contour-error layers decoder (606), the preferred embodiment is to use bitstream deformatter (602) also, as shown in FIG. 6.

Figure 7:
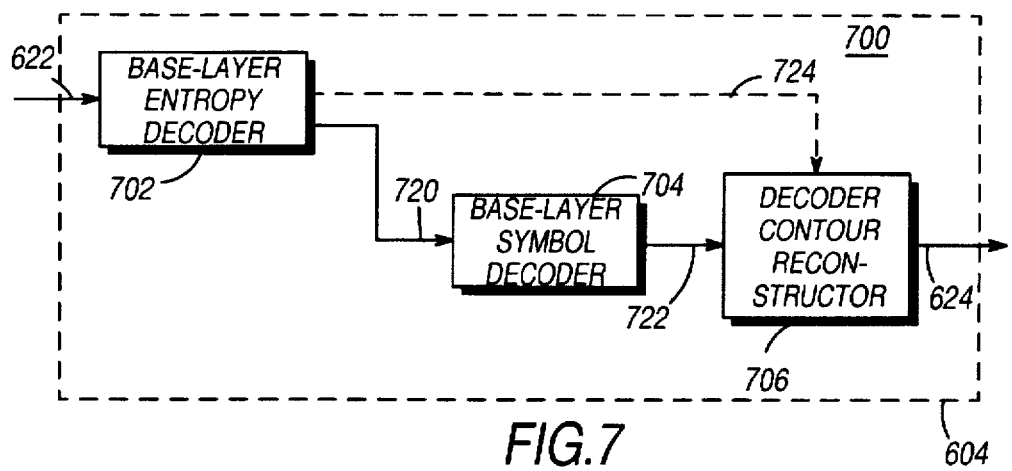
FIG. 7 is a block diagram of a preferred embodiment of the base-layer decoder of FIG. 6, shown with greater particularity, in accordance with the present invention.

FIG. 7, numeral 700, is a block diagram of one preferred embodiment of the base-layer decoder device (604), in accordance with the present invention. The base-layer entropy decoder (702), coupled to receive a vertex representation, typically the compact vertex representation (622), produces an ordered set of base-layer symbols and optionally a contour approximation method indicator (724), by decoding a compact vertex representation created by a predetermined entropy encoding method. The compact vertex representation is either the object adaptive compact vertex representation produced in FIG. 3 (300) or the two-layer macroblock-traversal compact vertex representation produced in FIG. 4 (400). Typical entropy encoding/decoding methods which may be used include fixed-length codes, huffman codes, and arithmetic codes. The preferred embodiment uses primarily arithmetic codes and some fixed-length codes.

The base-layer symbol decoder (704), coupled to the base-layer entropy encoder (702), decodes the ordered set of base-layer symbols (720) according to the preselected encoding method utilized and creates an ordered set of reconstructed vertices (722). The ordered set of base-layer symbols (720) may consist of the vertex relative-location dynamic range indicator (322) and the ordered set of vertex-location symbols (324). The ordered set of base-layer symbols (720) may alternatively consist of the ordered set of macroblock-traversal symbols (420) and possibly the ordered set of MBTB vertex-location symbols (422).

The decoder contour reconstructor (706), coupled to the base-layer symbol decoder (704) and where selected, to the base-layer entropy decoder (702), produces a base-layer approximate reconstruction of the discrete region contour (624) by applying a predetermined contour approximation method to the ordered set of reconstructed vertices (722). Optionally, the contour approximation method indicator (724) extracted by the base-layer entropy decoder (702) may be used to inform the decoder contour reconstructor (706) to use a specific contour approximation method which gives better quality reconstruction.

Figure 8:
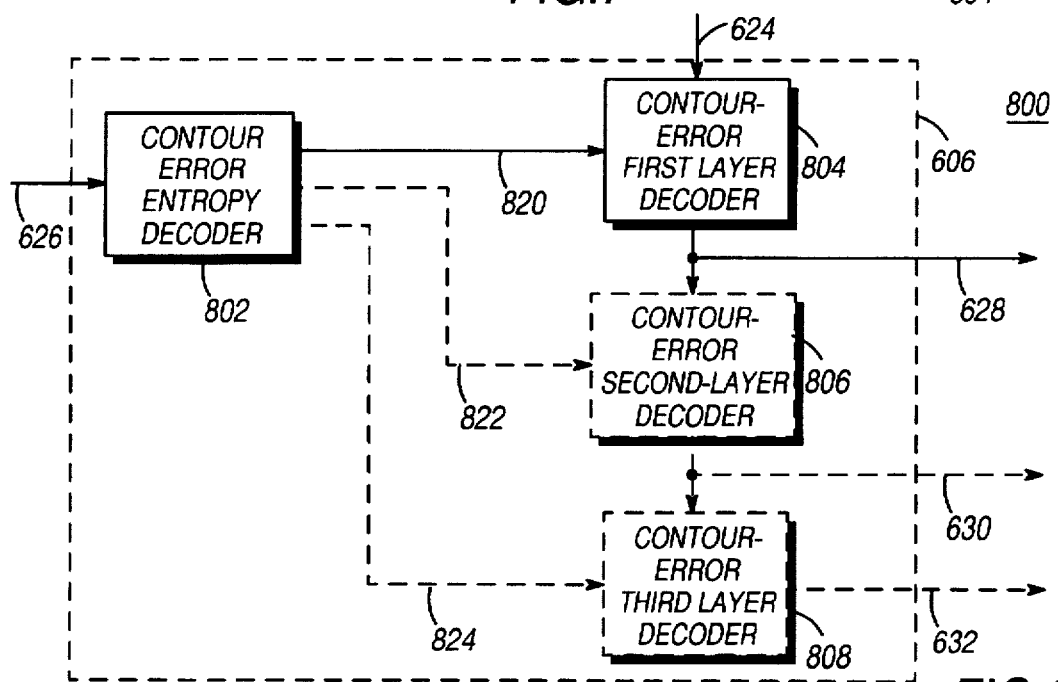
FIG. 8 is a block diagram of a preferred embodiment of the contour-error layers decoder of FIG. 6, shown with greater particularity, in accordance with the present invention.

FIG. 8, numeral 800, is a block diagram of one preferred embodiment of the contour-error layers decoder (606), in accordance with the present invention. The contour-error entropy decoder (802), coupled to receive a subset of the multi-layered compact contour-error representation (626), produces a first layer of contour-error symbols (820) by decoding the subset of the multi-layered compact contour-error representation (626) created by a predetermined entropy encoding method. Additionally, the contour-error entropy decoder (802) may produce a second layer of contour-error symbols (822) and possibly a third layer of contour-error symbols (824) which were also created by a predetermined entropy encoding method. Typical entropy encoding/decoding methods which may be used include fixed-length codes, huffman codes, and arithmetic codes. The preferred embodiment uses arithmetic codes.

The contour-error first layer decoder (804), coupled to the contour-error entropy decoder (802), creates a first enhanced approximate reconstruction of the DRC (628) by decoding the first layer of contour-error symbols (820) to get a first set of contour-error samples and combining the first set of contour-error samples with the base-layer approximate reconstruction of the DRC (624).

Where selected, the contour-error second layer decoder (806), coupled to the contour-error entropy decoder (802) and to the contour-error first layer decoder (806), creates a second enhanced approximate reconstruction of the DRC (630) by decoding the second layer of contour-error symbols (822) to get a second set of contour-error samples and combining the second set of contour-error samples with the first enhanced approximate reconstruction of the DRC (628).

Where selected, the contour-error third layer decoder (808), coupled to the contour-error entropy decoder (802) and to the contour-error second layer decoder (806), creates a third enhanced approximate reconstruction of the DRC (632) by decoding the third layer of contour-error symbols (824) to get a third set of contour-error samples and combining the third set of contour-error samples with the second enhanced approximate reconstruction of the DRC (630).

While the present invention includes any embodiment which uses at least the contour-error entropy decoder (802) and the contour-error first layer decoder (804), the preferred embodiment is to use all elements shown in FIG. 8. Alternative embodiments that require lower cost or are expected to receive bitstreams over low bit-rate channels may use just the contour-error entropy decoder (802) and the contour-error first layer decoder (804).

Figure 9A:
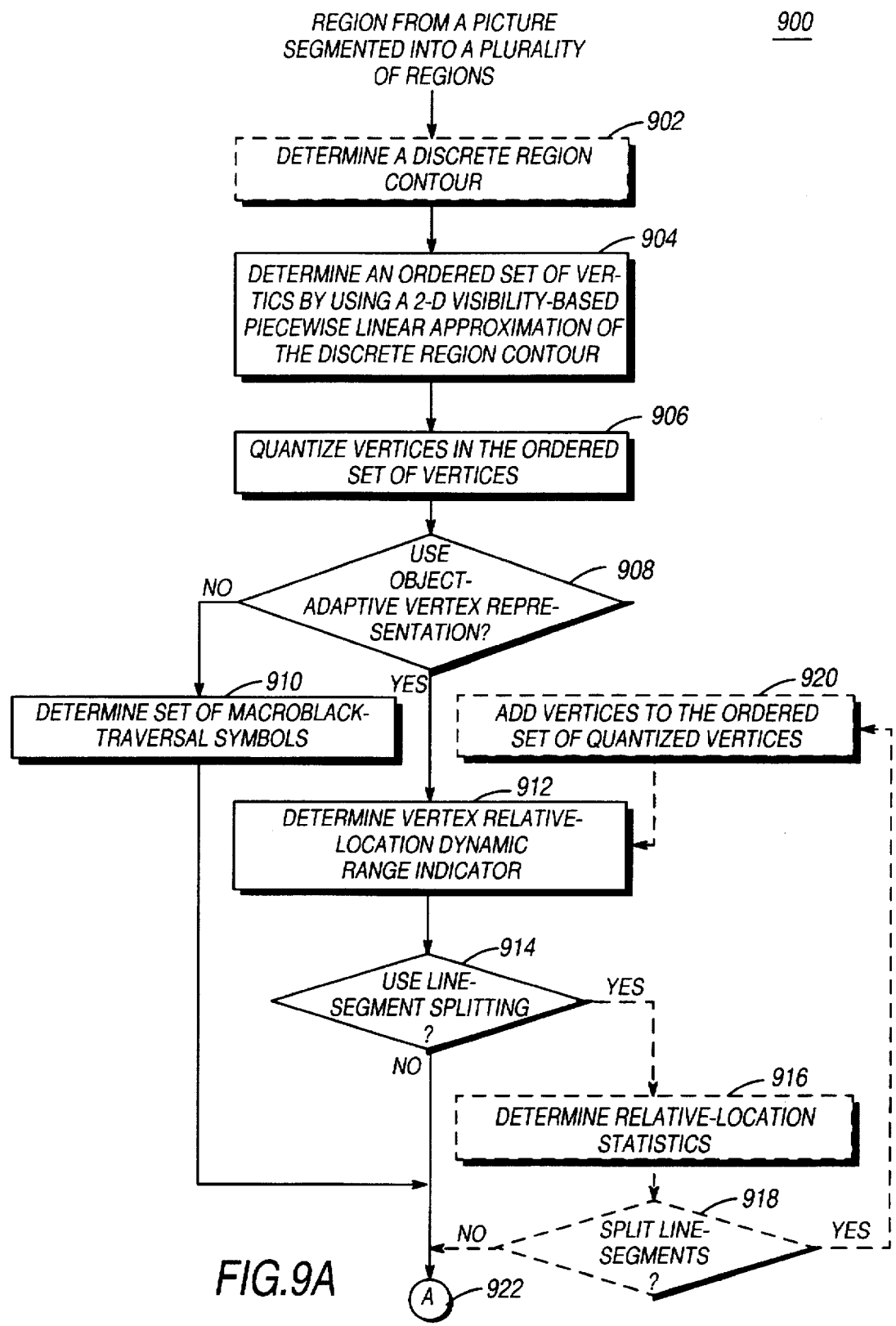
FIG. 9 is a flow chart of a preferred embodiment of steps of an encoding method, in accordance with the present invention.
Figure 9B:
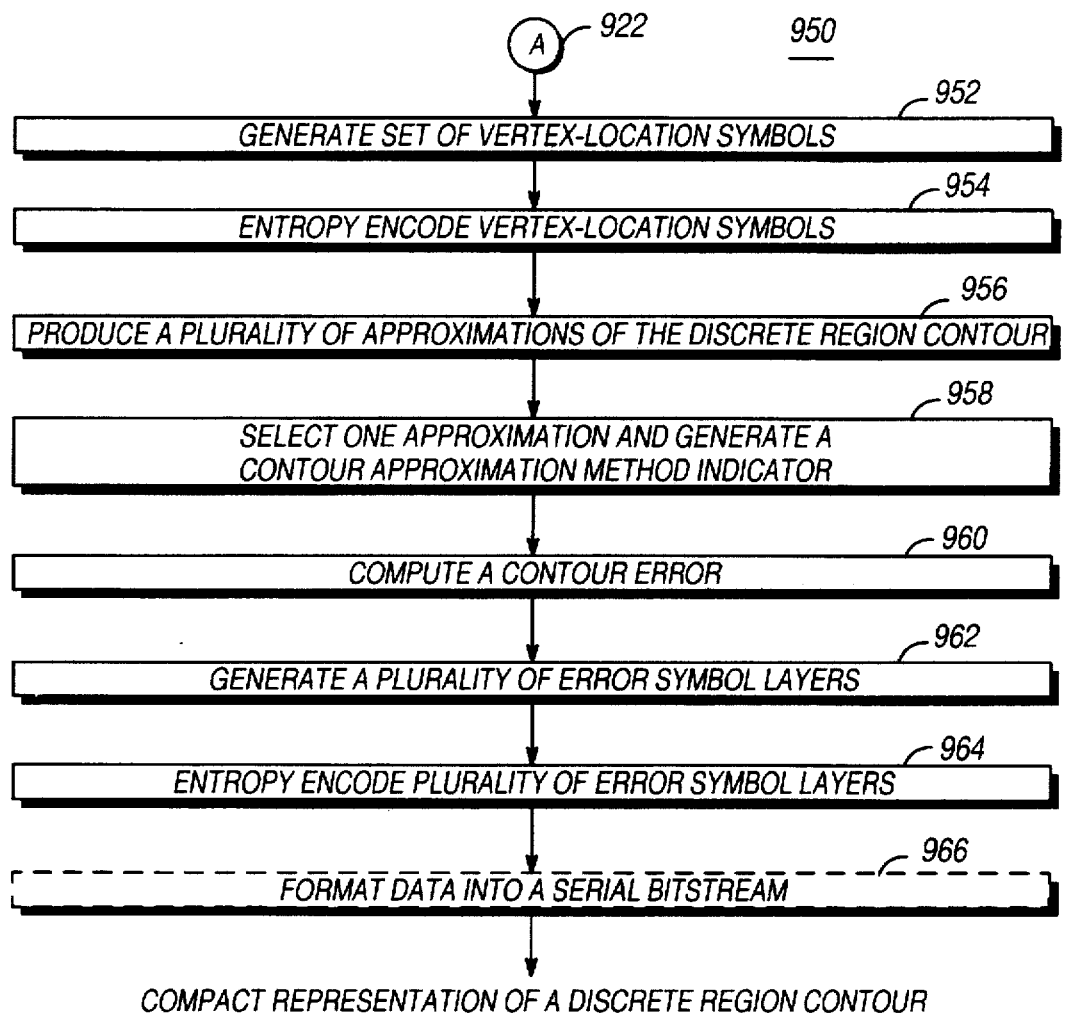

FIG. 9, numeral 900, is a flow chart of one preferred embodiment of steps of an encoding method, in accordance with the present invention. The encoding method begins by determining a discrete region contour (902) of a region from a picture segmented into a plurality of regions. Using a two-dimensional visibility-based piecewise linear approximation technique, an ordered set of vertices are determined which approximate the discrete region contour (904). Each of these vertices is then quantized to a targeted spatial resolution (906). In step (908) the compact vertex representation method is chosen. If the two-layer macroblock-traversal-based compact vertex representation is chosen, then a set of macroblock traversal symbols are determined (910) and then the flow continues with (922). Otherwise, a vertex relative-location dynamic range indicator is determined (912) and a decision whether to use a line-segment splitting technique is made (914). If line-segment splitting technique is in use, relative-location statistics are determined (916). Based on the relative-location statistics a decision is made whether to split line-segments (918). If line-segment splitting is chosen, then vertices are added to the ordered set of quantized vertices (920) so as to reduce the dynamic range of the relative-locations and the process returns to (912) to determine a new vertex relative-location dynamic range indicator. This process continues until the decision in (918) is to not split, and then the flow continues with (922).

If step (912) was executed, then (952) generates a set of vertex-location symbols needed to create the object-adaptive compact vertex representation. Otherwise, if step (910) was executed, then (952) generates a set of vertex-location symbols needed to create the two-layer macroblock-traversal compact vertex representation. The set of vertex-location symbols is then entropy encoded (954), producing a compact vertex representation.

From the set of vertex-location symbols, a plurality of approximations of the discrete region contour are produced (956). A best approximation is selected an a corresponding contour approximation method indicator is generated (958). In step (960) the contour error between the approximation and the discrete region contour is computed. A plurality of error symbol layers to represent the contour error is generated (962) and entropy encoded (964), resulting in a multi-layered compact contour-error representation for predictive scalable reconstruction. Optionally, the data produced in step (954) and step (964), namely the compact vertex representation and the multi-layered compact contour-error representation for predictive scalable reconstruction, respectively, are formatted into a serial bitstream (966) which is a compact representation of a discrete region contour.

Figure 10:
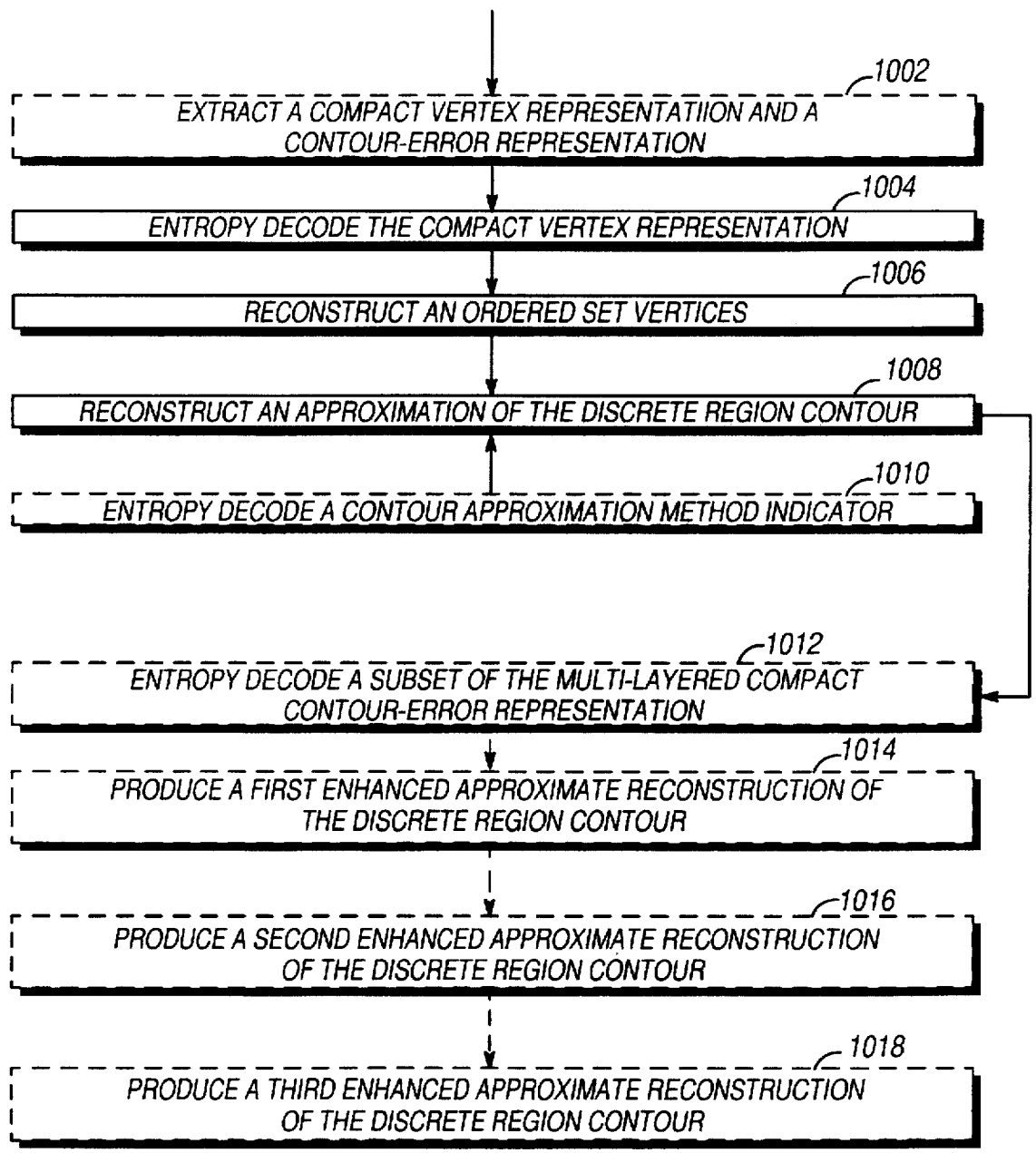
FIG. 10 is a flow chart of a preferred embodiment of steps of a decoding method, in accordance with the present invention.

FIG. 10, numeral 1000, is a flow chart of one preferred embodiment of steps of a decoding method, in accordance with the present invention. The decoding method begins by extracting a compact vertex representation and a contour-error representation from the compact representation of a discrete region contour (1002). The compact vertex representation is entropy decoded to produce a set of base-layer symbols (1004). From the set of base-layer symbols an ordered set of vertices are reconstructed (1006). Using a predetermined approximation method, an approximation of the discrete region contour is reconstructed from the ordered set of vertices (1008). Optionally, the approximation method may be determined for a DRC by entropy decoding a contour approximation method indicator (1010).

Depending on the desired reconstruction quality, a subset of the multi-layered compact contour-error representation is entropy decoded (1012), producing a plurality of error symbol layers. Combining the base-layer approximate reconstruction and a first layer of contour-error symbols, a first enhanced approximate reconstruction of the discrete region contour may be produced (1014). Furthermore, by combining the first enhanced approximate reconstruction and a second layer of contour-error symbols, a second enhanced approximate reconstruction of the discrete region contour may be produced (1016). Finally, by combining the second enhanced approximate reconstruction and a third layer of contour-error symbols, a third enhanced approximate reconstruction of the discrete region contour may be produced (1016).

The method and device may be selected to be embodied in at least one of: A) an application specific integrated circuit; B) a field programmable gate array; and C) a microprocessor; and D) a computer-readable memory; arranged and configured to provide compact representation of a discrete region contour in accordance with the scheme described in greater detail above.

We claim:

1. A device for compact representation of a discrete region contour, comprising an encoder and a decoder wherein:

A) the encoder, for producing a compact representation of the discrete region contour, comprises at least one of 1-3:

1) a structure quantizer, coupled to receive the discrete region contour, which determines an ordered set of quantized vertices that approximates the discrete region contour, wherein the structure quantizer includes:

1a) a structure estimator, operably coupled to receive the discrete region contour, for determining an ordered set of vertices using a two-dimensional visibility-based piecewise linear approximation technique which minimizes the number of vertices to approximate the discrete region contour; and 1b) a vertex quantizer, operably coupled to the structure estimator, for producing an ordered set of quantized vertices to facilitate compact representation of the ordered set of vertices; and 2) a vertex encoder, operably coupled to receive an ordered set of quantized vertices, for providing a compact vertex representation, wherein the vertex encoder includes one of a–b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols, and a3) a vertex entropy encoder, operably coupled to the dynamic range determiner and the vertex-location symbol generator, for producing the object-adaptive compact vertex representation; and

11 b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and 3) an error processor, operably coupled to receive the discrete region contour and to a structure quantizer, which produces a multi-layered compact contour-error representation for predictive scalable reconstruction, wherein the error processor includes 3a–3c:

3a) an encoder contour reconstructor, operably coupledd to receive an ordered set of quantized vertices, for reconstructing a plurality of approximations of the discrete region contour;

3b) a contour-error symbol generator, operably coupled to the contour reconstructor and to receive the discrete region contour, for producing a contour approximation method indicator and a plurality of error symbol layers; and 3c) a contour-error entropy encoder, operably coupled to the contour-error symbol generator, for producing the multi-layered compact contour-error representation for predictive scalable reconstruction; and B) the decoder, coupled to receive at least a subset of a serial bitstream of vertex representation and multi-layered contour-error representation information, comprising at least one of 1–2:

1) a base-layer decoder, operably coupled to receive a compact vertex representation for producing a base-layer approximate reconstruction of the discrete region contour, including:

1a) a base-layer entropy decoder, operably coupled to receive the compact vertex representation, for generating an ordered set of base-layer symbols;

1b) a base-layer symbol decoder, operably coupled to receive the ordered set of base-layer symbols, for generating an ordered set of reconstruct ed vertices; and 1c) a decoder contour reconstructor, operably coupledd to receive the ordered set of reconstructed vertices, for producing the base-layer approximate reconstruction of the discrete region contour; and 2) a contour-error layers decoder, operably coupled to receive at least a subset of the multi-layered contour-error representation information for predictive scalable reconstruction and to receive a base-layer approximate reconstruction of the discrete region contour, which produces a first enhanced approximate reconstruction of the discrete region contour, wherein the contour error layers decoder includes:

2a) a contour-error entropy decoder, operably coupled to receive the multi-layered compact contour-error representation, for generating at least a first layer of contour-error symbols; and

12

2b) a contour-error first layer decoder, operably coupled to receive the first layer of contour-error symbols and to receive the base-layer approximate reconstruction of the discrete region contour, for producing the first enhanced approximate reconstruction of the discrete region contour.

2. The device of claim 1, where if the encoder is implemented as a structure quantizer, the encoder further includes a structure preprocessor, coupled immediately prior to the structure quantizer to receive a region from a picture segmented into a plurality of regions, for processing the region to provide the discrete region contour.

3. The device of claim 1, where if the encoder includes the vertex encoder and the error processor, the encoder further includes a bitstream formatter, operably coupled to the vertex encoder and to the error processor, for organizing the compact vertex representation and the multi-layered contour-error representation to provide a serial bitstream of vertex representation and multi-layered contour-error representation information.

4. The device of claim 1 where if the encoder includes the structure quantizer, the two-dimensional visibility-based piecewise linear approximation technique for the structure estimator consists of:

A) setting an error tolerance range perpendicular to a tangent at each point in the discrete region contour, wherein the error tolerance range has an upper error bound and a lower error bound, B) selecting an initial starting point, C) initializing a view from the starting point to be between an upper error bound and a lower error bound of a next point, D) in repeated iterations, for each next point in the discrete region contour, narrowing the view based on the next point's upper error bound and lower error bound until the next point's error tolerance range is entirely outside the view, E) generating a vertex at a current point whose error tolerance range was at least partially inside the view, F) setting the starting point to be the current point whose error tolerance range was at least partially inside the view, G) repeating steps C–F until the current point is the initial starting point.

5. The device of claim 4 wherein, in the encoder, the error tolerance range at each point is adapted based on local features of the discrete region contour.

6. The device of claim 4 wherein, in the decoder, the initial point is selected to be a point at which the contour has its highest curvature.

7. The device of claim 1, where if the encoder includes the vertex encoder, the vertex encoder further includes, for the object-adaptive compact vertex representation, a line-segment splitter, coupled to receive the discrete region contour and to receive the ordered set of quantized vertices, for adding quantized vertices to the ordered set of quantized vertices between selected pairs of adjacent vertices which reduce the vertex relative-location dynamic range and facilitate a generation of a more bit-efficient representation.

8. The device of claim 7 wherein a splitting rule is used to determine whether to add quantized vertices to the ordered set of quantized vertices, wherein the splitting rule is: if $M/N <= 1/(1+E)$ then splitting occurs, where A) N is a current total number of vertices in the ordered set of quantized vertices, B) M is a current number of vertices whose relative horizontal locations are larger than the next smaller maximum horizontal displacement magnitude or whose relative vertical locations are larger than the next smaller maximum vertical displacement magnitude, and C) E is an expected number of bits/vertex if a next smaller dynamic range is used, and wherein when splitting occurs:

D) adding a quantized vertex along the discrete region contour for each of the M vertices, immediately prior to each of the M vertices in the ordered set of quantized vertices, E) updating the values of N, M, and E, and F) reapplying the splitting rule until the rule indicates ending splitting.

9. The device of claim 1, where if the encoder includes the vertex encoder, for the objective-adaptive compact vertex representation having the dynamic range determiner, the vertex relative-location dynamic range indicator is chosen from a predetermined table of dynamic ranges such that the vertex relative-location dynamic range indicator corresponds to a table entry which has a smallest range that includes all horizontal and vertical displacement magnitudes between adjacent vertices in the ordered set of quantized vertices.

10. The device of claim 1, where if the encoder includes a vertex encoder, for the object-adaptive compact vertex representation having the vertex-location symbol generator, the ordered set of vertex-location symbols correspond to an octant vertex representation, wherein symbols for each vertex are produced by:

A) calculating a relative location of a vertex relative to the previous vertex in the ordered set of quantized vertices, wherein the relative location has a horizontal component and a vertical component, B) determining the octant which the relative location belongs, and C) identifying a larger component and a smaller component of the horizontal component and vertical component.

11. The device of claim 10, wherein, for the vertex entropy encoder, the larger component is used to set a dynamic range for the smaller component to facilitate more compact coding of the smaller component.

12. The device of claim 1, where if the encoder includes the vertex encoder, for the vertex encoder having the two-layer macro block transversal based MBTB compact vertex representation, the macroblock-traversal symbol generator, the ordered set of macroblock-traversal symbols consists of differential chain codes for an ordered list of macroblocks which the discrete region contour traverses.

13. The device of claim 1, where if the encoder includes the vertex encoder, for the vertex encoder having the two-layer macro block transversal based MBTB compact vertex representation, further including the macroblock-traversal symbol generator, receiving the ordered set of quantized vertices, producing the ordered set of macroblock-traversal symbols for an ordered list of macroblocks traversed by a piecewise linear approximation using the ordered set of quantized vertices.

14. The device of claim 1, where if the encoder includes the vertex encoder, for the vertex encoder having the two-layer macro block transversal based MBTB compact vertex representation, for the MBTB vertex-location symbol generator, the ordered set of MBTB vertex-location symbols produced consists of a string of symbols for each vertex, wherein the string of symbols consists of:

A) zero, one, or a plurality of vertex__not__in__ macroblock symbols wherein each vertex__not__in__ macroblock symbol indicates that the vertex is not in a current macroblock from the ordered list of macroblocks and indicates to make a next macroblock in the ordered list of macroblocks the current macroblock, B) a vertex__in__macroblock symbol, wherein the vertex__in__macroblock symbol indicates that the vertex is in the current macroblock, and C) a horizontal vertex location symbol and a vertical vertex location symbol using the coordinates of the current macroblock.

15. The device of claim 1, where if the encoder includes the error processor for the contour-error symbol generator, the contour approximation method indicator is determined by choosing one of the plurality of approximations of the discrete region contour received from the encoder contour reconstructor which has a minimum distortion from to the discrete region contour.

16. The device of claim 15 wherein the minimum distortion is a summation of area between the discrete region contour and one of the plurality of approximations of the discrete region contour.

17. The device of claim 1, where if the encoder includes the error processor, for the contour-error symbol generator, the plurality of error symbol layers is comprised of three layers, wherein between each pair of adjacent vertices and along the chosen one of the plurality of approximations of the discrete region contour:

A) a first layer has a first predetermined number of error samples,

B) a second layer has a second predetermined number of error samples using prediction from the first layer, and C) a third layer has a third predetermined number of error samples using prediction from the second layer.

18. The device of claim 17 wherein the first predetermined number of error samples, the second predetermined number of error samples, and the third predetermined number of error samples is reduced when the two adjacent vertices are separated by less than a predetermined threshold.

19. The device of claim 1, where if the decoder includes the base-layer decoder, further including, for the decoder, a bitstream deformatter, coupled to receive the serial bitstream of vertex representation and multi-layered contour-error representation information, for separating the information into the compact vertex representation and the multi-layered compact contour-error representation.

20. The device of claim 1, where if the decoder includes the base-layer decoder, for the base-layer decoder, the ordered set of base-layer symbols generated by the base-layer entropy decoder contains only the ordered set of macroblock-traversal symbols produced by the macroblock-traversal symbol generator.

21. The device of claim 1, where if the decoder includes the baselayer decoder, for the base-layer decoder, the decoder contour reconstructor receives the contour approximation method indicator from the base-layer entropy encoder, producing an approximate reconstruction of the discrete region contour which has less distortion.

22. The device of claim 1, where if the decoder includes the contour-error layers decoder, further including, for the contour-error layers decoder, a contour-error second layer decoder, operably coupled to the contour-error entropy decoder and to receive a first enhanced approximate reconstruction of the discrete region contour, for providing a second enhanced approximate reconstruction of the discrete region contour.

23. The device of claim 1, where if the decoder includes the contour-error layers decoder, further including, for the contour-error layers decoder, a contour-error third layer decoder, operably coupled to the contour-error entropy decoder and to receive the second enhanced approximate reconstruction of the discrete region contour, for providing a third enhanced approximate reconstruction of the discrete region contour.

24. The device of claim 1 wherein the device is embodied in at least one of:

A) an application specific integrated circuit;

B) a field programmable gate array;

C) a microprocessor; and

D) a computer-readable memory; arranged and configured to provide compact representation of a discrete region contour in accordance with the scheme of claim 1.

25. A method for compact representation of a discrete region contour, comprising encoding and decoding, wherein:

A) the encoding includes, for producing a compact representation of the discrete region contour, at least one of 1-3:

1) determining, in an encoder, an ordered set of quantized vertices that approximates the discrete region contour, including:

1a) determining an ordered set of vertices using a two-dimensional visibility-based piecewise linear approximation technique which minimizes the number of vertices to approximate the discrete region contour; and 1b) producing the ordered set of quantized vertices to facilitate compact representation of the ordered set of vertices; and 2) providing, in the encoder, a compact vertex representation including one of:

a) providing an object-adaptive compact vertex representation of an ordered set of quantized vertices, including:

a1) determining a vertex relative-location dynamic range indicator;

a2) producing an ordered set of vertex-location symbols; and a3) producing the object-adaptive compact vertex representation; and b) providing a two-layer macroblock-traversal-based (MBTB) compact vertex representation of an ordered set of quantized vertices, including:

b1) producing an ordered set of macroblock-traversal symbols;

b2) producing an ordered set of MBTB vertex-location symbols; and b3) producing the two-layer MBTB compact vertex representation; and 3) producing, in the encoder, a multi-layered compact contour-error representation for predictive scalable reconstruction, including:

3a) reconstructing a plurality of approximations of the discrete region contour;

3b) producing a contour approximation method indicator and a plurality of error symbol layers; and 3c) producing the multi-layered compact contour-error representation for predictive scalable reconstruction; and B) the decoding includes, for receiving at least a subset of a serial bitstream of vertex representation and multi-layered contour-error representation information, at least one of 1-2, 1) producing, in a decoder, a base-layer approximate reconstruction of the discrete region contour, including:

1a) generating an ordered set of base-layer symbols;

1b) generating an ordered set of reconstructed vertices; and 1c) producing the base-layer approximate reconstruction of the discrete region contour; and 2) producing, in the decoder, a first enhanced approximate reconstruction of the discrete region contour, including:

2a) generating at least a first layer of contour-error symbols; and 2b) producing the first enhanced approximate reconstruction of the discrete region contour.

26. The method of claim 25, wherein the encoding further includes receiving a region from a picture segmented into a plurality of regions and processing the region to provide the discrete region contour.

27. The method of claim 25, where if the encoding includes providing a compact vertex representation and producing a multi-layered compact contour error representation, the encoding further includes organizing the compact vertex representation and the multi-layered contour-error representation to provide a serial bitstream of vertex representation and multi-layered contour-error representation information.

28. The method of claim 25, wherein the encoding includes utilizing the two-dimensional visibility-based piecewise linear approximation technique for determining an ordered set of vertices using a two-dimensional visibility-based piecewise linear approximation technique which minimizes the number of vertices to approximate the discrete region contour when determining, in an encoder, an ordered set of quantized vertices that approximates the discrete region contour, consisting of:

A) setting an error tolerance range perpendicular to the tangent at each point in the discrete region contour, wherein the error tolerance range has an upper error bound and a lower error bound, B) selecting an initial starting point, C) initializing a view from the starting point to be between an upper error bound and a lower error bound of a next point, D) in repeated iterations, for each next point in the discrete region contour, narrowing the view based on the next point's upper error bound and lower error bound until the next point's error tolerance range is entirely outside the view, E) generating a vertex at a current point whose error tolerance range was at least partially inside the view, F) setting the starting point to be the current point whose error tolerance range was at least partially inside the view, G) repeating steps C-F until the next point is an initial starting point.

29. The method of claim 28 wherein, for step A, the error tolerance range at each point is adapted based on local features of the discrete region contour.

30. The method of claim 28 wherein, for step B, the initial point is selected to be a point at which the contour has its highest curvature.

31. The method of claim 25, where encoding includes providing a compact vertex representation by providing an object-adaptive compact vertex representation of the ordered set of quantized vertices, adding quantized vertices to the ordered set of quantized vertices between selected pairs of adjacent vertices which reduce the vertex relative-location dynamic range and facilitate a generation of a more bit-efficient representation.

32. The method of claim 31 wherein a splitting rule is used to determine whether to add quantized vertices to the ordered set of quantized vertices, wherein the splitting rule is: if M/N<=1/(1+E) then splitting occurs, where A) N is a current total number of vertices in the ordered set of quantized vertices, B) M is a current number of vertices whose relative horizontal locations are larger than the next smaller maximum horizontal displacement magnitude or whose relative vertical locations are larger than the next smaller maximum vertical displacement magnitude, and C) E is an expected number of bits/vertex if a next smaller dynamic range is used, and further including, when splitting occurs:

D) adding a quantized vertex along the discrete region contour for each of the M vertices, immediately prior to each of the M vertices in the ordered set of quantized vertices, E) updating the values of N, M, and E, and F) reapplying the splitting rule until it indicates not to split further.

33. The method of claim 25, where encoding includes providing a compact vertex presentation by priding an object-adaptive compact vertex representation of the ordered set of quantized vertices, including, for encoding and determining a vertex relative-location dynamic range indicator, choosing the vertex relative-location dynamic range indicator from a predetermined table of dynamic ranges such that the vertex relative-location dynamic range indicator corresponds to a table entry which has a smallest range that includes all horizontal and vertical displacement magnitudes between adjacent vertices in the ordered set of quantized vertices.

34. The method of claim 25, where encoding includes providing a compact vertex presentation by priding an object-adaptive compact vertex representation of the ordered set of quantized vertices, including, for encoding, producing an ordered set of vertex-location symbols, wherein the ordered set of vertex-location symbols correspond to an octant vertex representation, wherein symbols for each vertex are produced by:

A) calculating a relative location of a vertex relative to the previous vertex in the ordered set of quantized vertices, wherein the relative location has a horizontal component and a vertical component, B) determining the octant which the relative location belongs, and C) identifying a larger component and a smaller component of the horizontal component and vertical component.

35. The method of claim 34, including, for encoding, in producing the object-adaptive compact vertex representation, wherein the larger component is used to set a dynamic range for the smaller component to facilitate more compact coding of the smaller component.

36. The method of claim 25, where the encoding includes providing the two layer macro-block traversal-based compact vertex representanion and includes, in encoding, in producing an ordered set of macroblock-traversal symbols, utilizing an ordered set of macroblock-traversal symbols that consists of differential chain codes for an ordered list of macroblocks which the discrete region contour traverses.

37. The method of claim 25, where the encoding includes providing the two layer macro-block traversal-based compact vertex representanion and includes, in encoding, in producing an ordered set of macroblock-traversal symbols, receiving the ordered set of quantized vertices, producing the ordered set of macroblock-traversal symbols for an ordered list of macroblocks traversed by a piecewise linear approximation using the ordered set of quantized vertices.

38. The method of claim 25, where the encoding includes providing the two layer macro-block traversal-based compact vertex representanion and includes, in encoding, in producing an ordered set of MBTB vertex-location symbols, utilizing an ordered set of MBTB vertex-location symbols produced that consists of a string of symbols for each vertex, wherein the string of symbols consists of:

A) zero, one, or a plurality of vertex__not__in__ macroblock symbols wherein each vertex__not__in__ macroblock symbol indicates that the vertex is not in a current macroblock from the ordered list of macroblocks and indicates to make a next macroblock in the ordered list of macroblocks the current macroblock, B) a vertex__in__macroblock symbol, wherein the vertex__in__macroblock symbol indicates that the vertex is in the current macroblock, and C) a horizontal vertex location symbol and a vertical vertex location symbol using the coordinates of the current macroblock.

39. The method of claim 25, wherein the encoding includes prucint a multi-layered compact contour-error representatin for predictive scalable reconstruction, including, for encoding, in producing a contour approximation method indicator and a plurality of error symbol layers, determining the contour approximation method indicator by choosing one of the plurality of approximations of the discrete region contour received from the encoder contour reconstructor which has a minimum distortion to the discrete region contour.

40. The method of claim 39 wherein the minimum distortion is a summation of area between the discrete region contour and one of the plurality of approximations of the discrete region contour.

41. The method of claim 25, wherein the encoding includes prucint a multi-layered compact contour-error representatin for predictive scalable reconstruction, including, for encoding, in producing a contour approximation method indicator and a plurality of error symbol layers, utilizing a plurality of error symbol layers comprised of three layers, wherein between each pair of adjacent vertices and along the chosen one of the plurality of approximations of the discrete region contour:

A) a first layer has a first predetermined number of error samples,

B) a second layer has a second predetermined number of error samples using prediction from the first layer, and C) a third layer has a third predetermined number of error samples using prediction from the second layer.

42. The method of claim 41 wherein the first predetermined number of error samples, the second predetermined number of error samples, and the third predetermined number of error samples is reduced when the two adjacent vertices are separated by less than a predetermined threshold.

43. The method of claim 25, where decoding includes both producing, in a decoder, a base-layer approximate reconstruction of the discrete region contour, including:

generating an ordered set of base-layer symbols;

generating an ordered set of reconstructed vertices; and producing the base-layer approximate reconstruction of the discrete region contour; and producing, in the decoder, a first enhanced approximate reconstruction of the discrete region contour, including:

generating at least a first layer of contour-error symbols; and producing the first enhanced approximate reconstruction of the discrete region contour, receiving the serial bitstream of vertex representation and multi-layered contour-error representation information and separating the information into the compact vertex representation and the multi-layered compact contour-error representation.

44. The method of claim 25, where decoding includes producing, in a decoder, a base-layer approximate reconstruction of the discrete region contour, including:

generating an ordered set of base-layer symbols;

generating an ordered set of reconstructed vertices; and producing the base-layer approximate reconstruction of the discrete region contour, including, in producing a base-layer approximate reconstruction of the discrete region contour, utilizing an ordered set of base-layer symbols that contains only an ordered set of macroblock-traversal symbols produced by producing an ordered set of macroblock-traversal symbols.

45. The method of claim 25, where decoding includes producing, in a decoder, a base-layer approximate reconstruction of the discrete region contour, including:

generating an ordered set of base-layer symbols;

generating an ordered set of reconstructed vertices; and producing the base-layer approximate reconstruction of the discrete region contour, including, in producing a base-layer approximate reconstruction of the discrete region contour, producing an approximate reconstruction of the discrete region contour which has less distortion.

46. The method of claim 25, where the decoding includes producing, in the decoder, a first enhanced approximate reconstruction of the discrete region contour, including:

generating at least a first layer of contour-error symbols; and producing the first enhanced approximate reconstruction of the discrete region contour, including, in producing a first enhanced approximate reconstruction of the discrete region contour, receiving a first enhanced approximate reconstruction of the discrete region contour and providing a second enhanced approximate reconstruction of the discrete region contour.

47. The method of claim 25, where the decoding includes producing, in the decoder, a first enhanced approximate reconstruction of the discrete region contour, including:

generating at least a first layer of contour-error symbols; and producing the first enhanced approximate reconstruction of the discrete region contour, including, in producing a first enhanced approximate reconstruction of the discrete region contour, receiving the second enhanced approximate reconstruction of the discrete region contour and providing a third enhanced approximate reconstruction of the discrete region contour.

48. The method of claim 25 wherein the method is a process whose steps are embodied in least one of:

A) an application specific integrated circuit;
B) a field programmable gate array; and
C) a microprocessor; and
D) a computer-readable memory;

arranged and configured to provide compact representation of a discrete region contour in accordance with the scheme of claim 25.

49. A encoder for compact representation of a discrete region contour, comprising:

a structure quantizer, coupled to receive the discrete region contour, which determines an ordered set of quantized vertices that approximates the discrete region contour, wherein the structure quantizer includes:

a) a structure estimator, operably coupled to receive the discrete region contour, for determining an ordered set of vertices using a two-dimensional visibility-based piecewise linear approximation technique which minimizes the number of vertices to approximate the discrete region contour; and b) a vertex quantizer, operably coupled to the structure estimator, for producing the ordered set of quantized vertices to facilitate compact representation of the ordered set of vertices.

50. An encoder for compact representation of a discrete region contour, comprising:

a vertex encoder, operably coupled to receive an ordered set of quantized vertices, for providing a compact vertex representation, wherein the vertex encoder includes one of a–b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols; and a3) a vertex entropy encoder, operably coupled to the dynamic range determiner and the vertex-location symbol generator, for producing the object-adaptive compact vertex representation; and b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation.

51. An encoder for compact representation of a discrete region contour, comprising:

an error processor, operably coupled to receive the discrete region contour, which produces a multi-layered contour-error representation information for predictive scalable reconstruction, wherein the error processor includes:
  a) an encoder contour reconstructor, operably coupledd to receive an ordered set of quantized vertices, for reconstructing a plurality of approximations of the discrete region contour;
  b) a contour-error symbol generator, operably coupled to the contour reconstructor and to receive the discrete region contour, for producing a contour approximation method indicator and a plurality of error symbol layers; and
  c) a contour-error entropy encoder, operably coupled to the contour-error symbol generator, for producing the multi-layered contour-error representation information for predictive scalable reconstruction.

52. A decoder for compact representation of a discrete region contour, coupled to receive at least a subset of a serial bitstream of vertex representation and multi-layered contour-error representation information, comprising:
  A) a base-layer decoder, operably coupled to receive a compact vertex representation, for producing a base-layer approximate reconstruction of the discrete region contour, including:
    1) a base-layer entropy decoder, operably coupled to receive the compact vertex representation, for generating an ordered set of base-layer symbols;
    2) a base-layer symbol decoder, operably coupled to receive the ordered set of base-layer symbols, for generating an ordered set of reconstructed vertices; and
    3) a decoder contour reconstructor, operably coupled to receive the ordered set of reconstructed vertices, for producing the base-layer approximate reconstruction of the discrete region contour.

53. An encoder for compact representation of a discrete region contour, comprising:
  A) a structure quantizer, coupled to receive the discrete region contour, which determines an ordered set of quantized vertices that approximates the discrete region contour, wherein the structure quantizer includes:
    1) a structure estimator, operably coupled to receive the discrete region contour, for determining an ordered set of vertices using a two-dimensional visibility-based piecewise linear approximation technique which minimizes the number of vertices to approximate the discrete region contour; and
    2) a vertex quantizer, operably coupled to the structure estimator, for producing the ordered set of quantized vertices to facilitate compact representation of the ordered set of vertices; and
  B) a vertex encoder, operably coupled to receive an ordered set of quantized vertices, for providing a compact vertex representation, wherein the vertex encoder includes one of 1–2:
    1) an object-adaptive compact vertex representation of the ordered set of quantized vertices, utilizing:
      a) a dynamic range determiner, operably coupled to receive the ordered set of quantized vertices, for determining a vertex relative-location dynamic range indicator;
      b) a vertex-location symbol generator, operably coupled to the dynamic range determiner and to receive the ordered set of quantized vertices, for producing an ordered set of vertex-location symbols; and
      c) a vertex entropy encoder, operably coupled to the dynamic range determiner and the vertex-location symbol generator, for producing the object-adaptive compact vertex representation; and
    2) a two-layer macroblock-traversal-based, MBTB, compact vertex representation of an ordered set of quantized vertices, utilizing:
      a) a macroblock-traversal symbol generator, operably coupled to receive the discrete region contour, for producing an ordered set of macroblock-traversal symbols;
      b) a MBTB vertex-location symbol generator, operably coupled to the macroblock-traversal symbol generator and to receive the ordered set of quantized vertices, for producing an ordered set of MBTB vertex-location symbols; and
      c) a MBTB vertex entropy encoder, operably coupled to the macroblock-traversal symbol generator and the MBTB vertex-location symbol generator, for producing the two-layer MBTB compact vertex representation.

54. An encoder for compact representation of a discrete region contour, comprising:
  A) a structure quantizer, coupled to receive the discrete region contour, which determines an ordered set of quantized vertices that approximates the discrete region contour, wherein the structure quantizer includes:
    1) a structure estimator, operably coupled to receive the discrete region contour, for determining an ordered set of vertices using a two-dimensional visibility-based piecewise linear approximation technique which minimizes the number of vertices to approximate the discrete region contour; and
    2) a vertex quantizer, operably coupled to the structure estimator, for producing the ordered set of quantized vertices to facilitate compact representation of the ordered set of vertices; and
  B) an error processor, operably coupled to receive the discrete region contour and to a structure quantizer, which produces a multi-layered contour-error representation information for predictive scalable reconstruction, wherein the error processor includes 1–3:
    1) an encoder contour reconstructor, operably coupledd to receive an ordered set of quantized vertices, for reconstructing a plurality of approximations of the discrete region contour;
    2) a contour-error symbol generator, operably coupled to the contour reconstructor and to receive the discrete region contour, for producing a contour approximation method indicator and a plurality of error symbol layers; and
    3) a contour-error entropy encoder, operably coupled to the contour-error symbol generator, for producing the multi-layered contour-error representation information for predictive scalable reconstruction.

55. An encoder for compact representation of a discrete region contour, comprising:
  A) a vertex encoder, operably coupled to receive an ordered set of quantized vertices, for providing a compact vertex representation, wherein the vertex encoder includes one of 1–2:
    1) an object-adaptive compact vertex representation of the ordered set of quantized vertices, utilizing:
      a) a dynamic range determiner, operably coupled to receive the ordered set of quantized vertices, for determining a vertex relative-location dynamic range indicator;
      b) a vertex-location symbol generator, operably coupled to the dynamic range determiner and to receive the ordered set of quantized vertices, for producing an ordered set of vertex-location symbols; and c) a vertex entropy encoder, operably coupled to the dynamic range determiner and the vertex-location symbol generator, for producing the object-adaptive compact vertex representation; and 2) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and B) an error processor, operably coupled to receive the discrete region contour and to a structure quantizer, which produces a multi-layered contour-error representation information for predictive scalable reconstruction, wherein the error processor includes 1-3:

1) an encoder contour reconstructor, operably coupledd to receive an ordered set of quantized vertices, for reconstructing a plurality of approximations of the discrete region contour;

2) a contour-error symbol generator, operably coupled to the contour reconstructor and to receive the discrete region contour, for producing a contour approximation method indicator and a plurality of error symbol layers; and 3) a contour-error entropy encoder, operably coupled to the contour-error symbol generator, for producing the multi-layered contour-error representation information for predictive scalable reconstruction.

56. An encoder for compact representation of a discrete region contour, comprising:

A) a structure quantizer, coupled to receive the discrete region contour, which determines an ordered set of quantized vertices that approximates the discrete region contour, wherein the structure quantizer includes:

1) a structure estimator, operably coupled to receive the discrete region contour, for determining an ordered set of vertices using a two-dimensional visibility-based piecewise linear approximation technique which minimizes the number of vertices to approximate the discrete region contour; and 2) a vertex quantizer, operably coupled to the structure estimator, for producing the ordered set of quantized vertices to facilitate compact representation of the ordered set of vertices; and B) a vertex encoder, operably coupled to receive an ordered set of quantized vertices, for providing a compact vertex representation, wherein the vertex encoder includes one of a-b:

1) an object-adaptive compact vertex representation of the ordered set of quantized vertices, utilizing:

a) a dynamic range determiner, operably coupled to receive the ordered set of quantized vertices, for determining a vertex relative-location dynamic range indicator;

b) a vertex-location symbol generator, operably coupled to the dynamic range determiner and to receive the ordered set of quantized vertices, for producing an ordered set of vertex-location symbols; and c) a vertex entropy encoder, operably coupled to the dynamic range determiner and the vertex-location symbol generator, for producing the object-adaptive compact vertex representation; and 2) a two-layer macroblock-traversal-based, MBTB, compact vertex representation of an ordered set of quantized vertices, utilizing:

a) a macroblock-traversal symbol generator, operably coupled to receive the discrete region contour, for producing an ordered set of macroblock-traversal symbols;

b) a MBTB vertex-location symbol generator, operably coupled to the macroblock-traversal symbol generator and to receive the ordered set of quantized vertices, for producing an ordered set of MBTB vertex-location symbols; and c) a MBTB vertex entropy encoder, operably coupled to the macroblock-traversal symbol generator and the MBTB vertex-location symbol generator, for producing the two-layer MBTB compact vertex representation; and C) an error processor, operably coupled to receive the discrete region contour and to a structure quantizer, which produces a multi-layered contour-error representation information for predictive scalable reconstruction, wherein the error processor includes 1-3:

1) an encoder contour reconstructor, operably coupledd to receive an ordered set of quantized vertices, for reconstructing a plurality of approximations of the discrete region contour;

2) a contour-error symbol generator, operably coupled to the contour reconstructor and to receive the discrete region contour, for producing a contour approximation method indicator and a plurality of error symbol layers; and 3) a contour-error entropy encoder, operably coupled to the contour-error symbol generator, for producing the multi-layered contour-error representation information for predictive scalable reconstruction.

57. A decoder for compact representation of a discrete region contour, coupled to receive at least a subset of a serial bitstream of vertex representation and multi-layered contour-error representation information, comprising:

A) a base-layer decoder, operably coupled to receive a compact vertex representation for producing a base-layer approximate reconstruction of the discrete region contour, including:

1) a base-layer entropy decoder, operably coupled to receive the compact vertex representation, for generating an ordered set of base-layer symbols;

2) a base-layer symbol decoder, operably coupled to receive the ordered set of base-layer symbols, for generating an ordered set of reconstructed vertices; and 3) a decoder contour reconstructor, operably coupled to receive the ordered set of reconstructed vertices, for producing the base-layer approximate reconstruction of the discrete region contour; and B) a contour-error layers decoder, operably coupled to receive at least a subset of the multi-layered contour-error representation information information for predictive scalable reconstruction and to receive the base-layer approximate reconstruction of the discrete region contour, which produces a first enhanced approximate reconstruction of the discrete region contour, wherein the contour error layers decoder includes:

1) a contour-error entropy decoder, operably coupled to receive the multi-layered contour-error representation information, for generating at least a first layer of contour-error symbols; and
2) a contour-error first layer decoder, operably coupled to receive the first layer of contour-error symbols and to receive the base-layer approximate reconstruction of the discrete region contour, for producing the first enhanced approximate reconstruction of the discrete region contour.

58. A device for compact representation of a discrete region contour, comprising an encoder and a decoder wherein:

A) the encoder, for producing a compact representation of the discrete region contour, comprises:
1) a structure quantizer, coupled to receive the discrete region contour, which determines an ordered set of quantized vertices that approximates the discrete region contour, wherein the structure quantizer includes:
   1a) a structure estimator, operably coupled to receive the discrete region contour, for determining an ordered set of vertices using a two-dimensional visibility-based piecewise linear approximation technique which minimizes the number of vertices to approximate the discrete region contour; and
   1b) a vertex quantizer, operably coupled to the structure estimator, for producing the ordered set of quantized vertices to facilitate compact representation of the ordered set of vertices; and
2) a vertex ecnoder, operably coupled to receive an ordered set of quantized vertices, for providing a compact vertex representation, wherein the vertex encoder includes one of a–b:
   a) an object-adaptive compact vertex representation of the ordered set of quantized vertices, utilizing:
      a1) a dynamic range determiner, operably coupled to receive the ordered set of quantized vertices, for determining a vertex relative-location dynamic range indicator;
      a2) a vertex-location symbol generator, operably coupled to the dynamic range determiner and to receive the ordered set of quantized vertices, for producing an ordered set of vertex-location symbols; and
      a3) a vertex entropy encoder, operably coupled to the dynamic range determiner and the vertex-location symbol generator, for producing the object-adaptive compact vertex representation; and
   b) a two-layer macroblock-traversal-based, MBTB, compact vertex representation of an ordered set of quantized vertices, utilizing:
      b1) a macroblock-traversal symbol generator, operably coupled to receive the discrete region contour, for producing an ordered set of macroblock-traversal symbols;
      b2) a MBTB vertex-location symbol generator, operably coupled to the macroblock-traversal symbol generator and to receive the ordered set of quantized vertices, for producing an ordered set of MBTB vertex-location symbols; and
      b3) a MBTB vertex entropy encoder, operably coupled to the macroblock-traversal symbol generator and the MBTB vertex-location symbol generator, for producing the two-layer MBTB compact vertex representation; and B) the decoder, coupled to receive at least a subset of a serial bitstream of vertex representation and multi-layered contour-error representation information, comprising:
a base-layer decoder, operably coupled to receive a compact vertex representation, for producing a base-layer approximate reconstruction of the discrete region contour, including:
   a) a base-layer entropy decoder, operably coupled to receive the compact vertex representation, for generating an ordered set of base-layer symbols;
   b) a base-layer symbol decoder, operably coupled to receive the ordered set of base-layer symbols, for generating an ordered set of reconstructed vertices; and
   c) a decoder contour reconstructor, operably coupled to receive the ordered set of reconstructed vertices, for producing the base-layer approximate reconstruction of the discrete region contour.

59. A device for compact representation of a discrete region contour, comprising an encoder and a decoder wherein:

A) the encoder, for producing a compact representation of the discrete region contour, comprises:
1) a structure quantizer, coupled to receive the discrete region contour, which determines an ordered set of quantized vertices that approximates the discrete region contour, wherein the structure quantizer includes:
   1a) a structure estimator, operably coupled to receive the discrete region contour, for determining an ordered set of vertices using a two-dimensional visibility-based piecewise linear approximation technique which minimizes the number of vertices to approximate the discrete region contour; and
   1b) a vertex quantizer, operably coupled to the structure estimator, for producing the ordered set of quantized vertices to facilitate compact representation of the ordered set of vertices; and
2) a vertex encoder, operably coupled to receive an ordered set of quantized vertices, for providing a compact vertex representation, wherein the vertex encoder includes one of a–b:
   a) an object-adaptive compact vertex representation of the ordered set of quantized vertices, utilizing:
      a1) a dynamic range determiner, operably coupled to receive the ordered set of quantized vertices, for determining a vertex relative-location dynamic range indicator;
      a2) a vertex-location symbol generator, operably coupled to the dynamic range determiner and to receive the ordered set of quantized vertices, for producing an ordered set of vertex-location symbols; and
      a3) a vertex entropy encoder, operably coupled to the dynamic range determiner and the vertex-location symbol generator, for producing the object-adaptive compact vertex representation; and
   b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and B) the decoder, coupled to receive at least a subset of a serial bitstream of vertex representation and multi-layered contour-error representation information, comprising:

1) a base-layer decoder, operably coupled to receive a compact vertex representation, for producing a base-layer approximate reconstruction of the discrete region contour, including:

1a) a base-layer entropy decoder, operably coupled to receive the compact vertex representation, for generating an ordered set of base-layer symbols;

1b) a base-layer symbol decoder, operably coupled to receive the ordered set of base-layer symbols, for generating an ordered set of reconstructed vertices; and 1c) a decoder contour reconstructor, operably coupled to receive the ordered set of reconstructed vertices, for producing the base-layer approximate reconstruction of the discrete region contour; and 2) a contour-error layers decoder, operably coupled to receive at least a subset of the multi-layered contour-error representation information for predictive scalable reconstruction and to receive the base-layer approximate reconstruction of the discrete region contour, which produces a first enhanced approximate reconstruction of the discrete region contour, wherein the contour error layers decoder includes:

2a) a contour-error entropy decoder, operably coupled to receive the multi-layered contour-error representation information, for generating at least a first layer of contour-error symbols; and 2b) a contour-error first layer decoder, operably coupled to receive the first layer of contour-error symbols and to receive the base-layer approximate reconstruction of the discrete region contour, for producing the first enhanced approximate reconstruction of the discrete region contour.

60. A device for compact representation of a discrete region contour, comprising an encoder and a decoder wherein:

A) the encoder, for producing a compact representation of the discrete region contour, comprises:

1) a structure quantizer, coupled to receive the discrete region contour, which determines an ordered set of quantized vertices that approximates the discrete region contour, wherein the structure quantizer includes:

1a) a structure estimator, operably coupled to receive the discrete region contour, for determining an ordered set of vertices using a two-dimensional visibility-based piecewise linear approximation technique which minimizes the number of vertices to approximate the discrete region contour; and 1b) a vertex quantizer, operably coupled to the structure estimator, for producing the ordered set of quantized vertices to facilitate compact representation of the ordered set of vertices; and 2) an error processor, operably coupled to receive the discrete region contour and to a structure quantizer, which produces a multi-layered contour-error representation information for predictive scalable reconstruction, wherein the error processor includes 2a–2c:

2a) an encoder contour reconstructor, operably coupledd to receive an ordered set of quantized vertices, for reconstructing a plurality of approximations of the discrete region contour;

2b) a contour-error symbol generator, operably coupled to the contour reconstructor and to receive the discrete region contour, for producing a contour approximation method indicator and a plurality of error symbol layers; and 2c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

a base-layer decoder, operably coupled to receive a compact vertex representation, for producing a base-layer approximate reconstruction of the discrete region contour, including:

1) a base-layer entropy decoder, operably coupled to receive the compact vertex representation, for generating an ordered set of base-layer symbols;

2) a base-layer symbol decoder, operably coupled to receive the ordered set of base-layer symbols, for generating an ordered set of reconstructed vertices; and 3) a decoder contour reconstructor, operably coupled to receive the ordered set of reconstructed vertices, for producing the base-layer approximate reconstruction of the discrete region contour.

61. A device for compact representation of a discrete region contour, comprising an encoder and a decoder wherein:

A) the encoder, for producing a compact representation of the discrete region contour, comprises:

1) a structure quantizer, coupled to receive the discrete region contour, which determines an ordered set of quantized vertices that approximates the discrete region contour, wherein the structure quantizer includes:

1a) a structure estimator, operably coupled to receive the discrete region contour, for determining an ordered set of vertices using a two-dimensional visibility-based piecewise linear approximation technique which minimizes the number of vertices to approximate the discrete region contour; and 1b) a vertex quantizer, operably coupled to the structure estimator, for producing the ordered set of quantized vertices to facilitate compact representation of the ordered set of vertices; and 2) an error processor, operably coupled to receive the discrete region contour and to a structure quantizer, which produces a multi-layered contour-error representation information for predictive scalable reconstruction, wherein the error processor includes 2a–2c:

2a) an encoder contour reconstructor, operably coupledd to receive an ordered set of quantized vertices, for reconstructing a plurality of approximations of the discrete region contour;

2b) a contour-error symbol generator, operably coupled to the contour reconstructor and to receive the discrete region contour, for producing a contour approximation method indicator and a plurality of error symbol layers; and 2c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

a contour-error layers decoder, operably coupled to receive at least a subset of the multi-layered contour-error representation information for predictive scalable reconstruction and to receive the base-layer approximate reconstruction of the discrete region contour, which produces a first enhanced approximate reconstruction of the discrete region contour, wherein the contour error layers decoder includes:

a) a contour-error entropy decoder, operably coupled to receive the multi-layered contour-error representation information, for generating at least a first layer of contour-error symbols; and b) a contour-error first layer decoder, operably coupled to receive the first layer of contour-error symbols and to receive the base-layer approximate reconstruction of the discrete region contour, for producing the first enhanced approximate reconstruction of the discrete region contour.

62. A device for compact representation of a discrete region contour, comprising an encoder and a decoder wherein:

A) the encoder, for producing a compact representation of the discrete region contour, comprises:

1) a structure quantizer, coupled to receive the discrete region contour, which determines an ordered set of quantized vertices that approximates the discrete region contour, wherein the structure quantizer includes:

1a) a structure estimator, operably coupled to receive the discrete region contour, for determining an ordered set of vertices using a two-dimensional visibility-based piecewise linear approximation technique which minimizes the number of vertices to approximate the discrete region contour; and 1b) a vertex quantizer, operably coupled to the structure estimator, for producing the ordered set of quantized vertices to facilitate compact representation of the ordered set of vertices; and 2) an error processor, operably coupled to receive the discrete region contour and to a structure quantizer, which produces a multi-layered contour-error representation information for predictive scalable reconstruction, wherein the error processor includes 2a-2c:

2a) an encoder contour reconstructor, operably coupledd to receive an ordered set of quantized vertices, for reconstructing a plurality of approximations of the discrete region contour;

2b) a contour-error symbol generator, operably coupled to the contour reconstructor and to receive the discrete region contour, for producing a contour approximation method indicator and a plurality of error symbol layers; and 2c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

1) a base-layer decoder, operably coupled to receive a compact vertex representation, for producing a base-layer approximate reconstruction of the discrete region contour, including:

1a) a base-layer entropy decoder, operably coupled to receive the compact vertex representation, for generating an ordered set of base-layer symbols;

1b) a base-layer symbol decoder, operably coupled to receive the ordered set of base-layer symbols, for generating an ordered set of reconstructed vertices; and 1c) a decoder contour reconstructor, operably coupled to receive the ordered set of reconstructed vertices, for producing the base-layer approximate reconstruction of the discrete region contour; and 2) a contour-error layers decoder, operably coupled to receive at least a subset of the multi-layered contour-error representation information for predictive scalable reconstruction and to receive the base-layer approximate reconstruction of the discrete region contour, which produces a first enhanced approximate reconstruction of the discrete region contour, wherein the contour error layers decoder includes:

2a) a contour-error entropy decoder, operably coupled to receive the multi-layered contour-error representation information, for generating at least a first layer of contour-error symbols; and 2b) a contour-error first layer decoder, operably coupled to receive the first layer of contour-error symbols and to receive the base-layer approximate reconstruction of the discrete region contour, for producing the first enhanced approximate reconstruction of the discrete region contour.

63. A device for compact representation of a discrete region contour, comprising an encoder and a decoder wherein:

A) the encoder, for producing a compact representation of the discrete region contour, comprises:

1) a vertex encoder, operably coupled to receive an ordered set of quantized vertices, for providing a compact vertex representation, wherein the vertex encoder includes one of a-b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols; and a3) a vertex entropy encoder, operably coupled to the dynamic range determiner and the vertex-location symbol generator, for producing the object-adaptive compact vertex representation; and b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and 2) an error processor, operably coupled to receive the discrete region contour and to a structure quantizer, which produces a multi-layered contour-error representation information for predictive scalable reconstruction, wherein the error processor includes 2a–2c:

2a) an encoder contour reconstructor, operably coupledd to receive an ordered set of quantized vertices, for reconstructing a plurality of approximations of the discrete region contour;

2b) a contour-error symbol generator, operably coupled to the contour reconstructor and to receive the discrete region contour, for producing a contour approximation method indicator and a plurality of error symbol layers; and 2c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

a base-layer decoder, operably coupled to receive a compact vertex representation, for producing a base-layer approximate reconstruction of the discrete region contour, including:

1) a base-layer entropy decoder, operably coupled to receive the compact vertex representation, for generating an ordered set of base-layer symbols;

2) a base-layer symbol decoder, operably coupled to receive the ordered set of base-layer symbols, for generating an ordered set of reconstructed vertices; and 3) a decoder contour reconstructor, operably coupled to receive the ordered set of reconstructed vertices, for producing the base-layer approximate reconstruction of the discrete region contour.

64. A device for compact representation of a discrete region contour, comprising an encoder and a decoder wherein:

A) the encoder, for producing a compact representation of the discrete region contour, comprises:

1) a vertex encoder, operably coupled to receive an ordered set of quantized vertices, for providing a compact vertex representation, wherein the vertex encoder includes one of a–b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols; and a3) a vertex entropy encoder, operably coupled to the dynamic range determiner and the vertex-location symbol generator, for producing the object-adaptive compact vertex representation; and b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and 2) an error processor, operably coupled to receive the discrete region contour and to a structure quantizer, which produces a multi-layered contour-error representation information for predictive scalable reconstruction, wherein the error processor includes 2a–2c:

2a) an encoder contour reconstructor, operably coupledd to receive an ordered set of quantized vertices, for reconstructing a plurality of approximations of the discrete region contour;

2b) a contour-error symbol generator, operably coupled to the contour reconstructor and to receive the discrete region contour, for producing a contour approximation method indicator and a plurality of error symbol layers; and 2c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

a contour-error layers decoder, operably coupled to receive at least a subset of the multi-layered contour-error representation information for predictive scalable reconstruction and to receive the base-layer approximate reconstruction of the discrete region contour, which produces a first enhanced approximate reconstruction of the discrete region contour, wherein the contour error layers decoder includes:

a) a contour-error entropy decoder, operably coupled to receive the multi-layered contour-error representation information, for generating at least a first layer of contour-error symbols; and b) a contour-error first layer decoder, operably coupled to receive the first layer of contour-error symbols and to receive the base-layer approximate reconstruction of the discrete region contour, for producing the first enhanced approximate reconstruction of the discrete region contour.

65. A device for compact representation of a discrete region contour, comprising an encoder and a decoder wherein:

A) the encoder, for producing a compact representation of the discrete region contour, comprises:

1) a vertex encoder, operably coupled to receive an ordered set of quantized vertices, for providing a compact vertex representation, wherein the vertex encoder includes one of a–b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols; and a3) a vertex entropy encoder, operably coupled to the dynamic range determiner and the vertex-location symbol generator, for producing the object-adaptive compact vertex representation; and b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and 2) an error processor, operably coupled to receive the discrete region contour and to a structure quantizer, which produces a multi-layered contour-error representation information for predictive scalable reconstruction, wherein the error processor includes 2a–2c:

2a) an encoder contour reconstructor, operably coupledd to receive an ordered set of quantized vertices, for reconstructing a plurality of approximations of the discrete region contour;

2b) a contour-error symbol generator, operably coupled to the contour reconstructor and to receive the discrete region contour, for producing a contour approximation method indicator and a plurality of error symbol layers; and 2c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

1) a base-layer decoder, operably coupled to receive a compact vertex representation, for producing a base-layer approximate reconstruction of the discrete region contour, including:

1a) a base-layer entropy decoder, operably coupled to receive the compact vertex representation, for generating an ordered set of base-layer symbols;

1b) a base-layer symbol decoder, operably coupled to receive the ordered set of base-layer symbols, for generating an ordered set of reconstructed vertices; and 1c) a decoder contour reconstructor, operably coupled to receive the ordered set of reconstructed vertices, for producing the base-layer approximate reconstruction of the discrete region contour; and 2) a contour-error layers decoder, operably coupled to receive at least a subset of the multi-layered contour-error representation information for predictive scalable reconstruction and to receive the base-layer approximate reconstruction of the discrete region contour, which produces a first enhanced approximate reconstruction of the discrete region contour, wherein the contour error layers decoder includes:

2a) a contour-error entropy decoder, operably coupled to receive the multi-layered contour-error representation information, for generating at least a first layer of contour-error symbols; and 2b) a contour-error first layer decoder, operably coupled to receive the first layer of contour-error symbols and to receive the base-layer approximate reconstruction of the discrete region contour, for producing the first enhanced approximate reconstruction of the discrete region contour.

66. A device for compact representation of a discrete region contour, comprising an encoder and a decoder wherein:

A) the encoder, for producing a compact representation of the discrete region contour, comprises:

1) a structure quantizer, coupled to receive the discrete region contour, which determines an ordered set of quantized vertices that approximates the discrete region contour, wherein the structure quantizer includes:

1a) a structure estimator, operably coupled to receive the discrete region contour, for determining an ordered set of vertices using a two-dimensional visibility-based piecewise linear approximation technique which minimizes the number of vertices to approximate the discrete region contour; and 1b) a vertex quantizer, operably coupled to the structure estimator, for producing the ordered set of quantized vertices to facilitate compact representation of the ordered set of vertices; and 2) a vertex encoder, operably coupled to receive the ordered set of quantized vertices, for providing a compact vertex representation, wherein the vertex encoder includes one of a–b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols; and a3) a vertex entropy encoder, operably coupled to the dynamic range determiner and the vertex-location symbol generator, for producing the object-adaptive compact vertex representation; and b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and 3) an error processor, operably coupled to receive the discrete region contour and to a structure quantizer, which produces a multi-layered contour-error representation information for predictive scalable reconstruction, wherein the error processor includes 3a–3c:

3a) an encoder contour reconstructor, operably coupledd to receive an ordered set of quantized vertices, for reconstructing a plurality of approximations of the discrete region contour;

3b) a contour-error symbol generator, operably coupled to the contour reconstructor and to receive the discrete region contour, for producing a contour approximation method indicator and a plurality of error symbol layers; and 3c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

a base-layer decoder, operably coupled to receive a compact vertex representation, for producing a base-layer approximate reconstruction of the discrete region contour, including:

a) a base-layer entropy decoder, operably coupled to receive the compact vertex representation, for generating an ordered set of base-layer symbols;

b) a base-layer symbol decoder, operably coupled to receive the ordered set of base-layer symbols, for generating an ordered set of reconstructed vertices; and c) a decoder contour reconstructor, operably coupled to receive the ordered set of reconstructed vertices, for producing the base-layer approximate reconstruction of the discrete region contour.

67. A device for compact representation of a discrete region contour, comprising an encoder and a decoder wherein:

A) the encoder, for producing a compact representation of the discrete region contour, comprises:

1) a structure quantizer, coupled to receive the discrete region contour, which determines an ordered set of quantized vertices that approximates the discrete region contour, wherein the structure quantizer includes:

1a) a structure estimator, operably coupled to receive the discrete region contour, for determining an ordered set of vertices using a two-dimensional visibility-based piecewise linear approximation technique which minimizes the number of vertices to approximate the discrete region contour; and 1b) a vertex quantizer, operably coupled to the structure estimator, for producing the ordered set of quantized vertices to facilitate compact representation of the ordered set of vertices; and 2) a vertex encoder, operably coupled to receive an ordered set of quantized vertices, for providing a compact vertex representation, wherein the vertex encoder includes one of a–b:

a) an object-adaptive compact vertex representation of the ordered set of quantized vertices, utilizing:

a1) a dynamic range determiner, operably coupled to receive the ordered set of quantized vertices, for determining a vertex relative-location dynamic range indicator;

a2) a vertex-location symbol generator, operably coupled to the dynamic range determiner and to receive the ordered set of quantized vertices, for producing an ordered set of vertex-location symbols; and a3) a vertex entropy encoder, operably coupled to the dynamic range determiner and the vertex-location symbol generator, for producing the object-adaptive compact vertex representation; and b) a two-layer macroblock-traversal-based, MBTB, compact vertex representation of an ordered set of quantized vertices, utilizing:

b1) a macroblock-traversal symbol generator, operably coupled to receive the discrete region contour, for producing an ordered set of macroblock-traversal symbols;

b2) a MBTB vertex-location symbol generator, operably coupled to the macroblock-traversal symbol generator and to receive the ordered set of quantized vertices, for producing an ordered set of MBTB vertex-location symbols; and b3) a MBTB vertex entropy encoder, operably coupled to the macroblock-traversal symbol generator and the MBTB vertex-location symbol generator, for producing the two-layer MBTB compact vertex representation; and 3) an error processor, operably coupled to receive the discrete region contour and to a structure quantizer, which produces a multi-layered contour-error representation information for predictive scalable reconstruction, wherein the error processor includes 3a–3c:

3a) an encoder contour reconstructor, operably coupledd to receive an ordered set of quantized vertices, for reconstructing a plurality of approximations of the discrete region contour;

3b) a contour-error symbol generator, operably coupled to the contour reconstructor and to receive the discrete region contour, for producing a contour approximation method indicator and a plurality of error symbol layers; and 3c) a contour-error entropy encoder, operably coupled to the contour-error symbol generator, for producing the multi-layered contour-error representation information for predictive scalable reconstruction; and B) the decoder, coupled to receive at least a subset of a serial bitstream of vertex representation and multi-layered contour-error representation information, comprising:

a contour-error layers decoder, operably coupled to receive at least a subset of the multi-layered contour-error representation information for predictive scalable reconstruction and to receive the base-layer approximate reconstruction of the discrete region contour, which produces a first enhanced approximate reconstruction of the discrete region contour, wherein the contour error layers decoder includes:

a) a contour-error entropy decoder, operably coupled to receive the multi-layered contour-error representation information, for generating at least a first layer of contour-error symbols; and b) a contour-error first layer decoder, operably coupled to receive the first layer of contour-error symbols and to receive the base-layer approximate reconstruction of the discrete region contour, for producing the first enhanced approximate reconstruction of the discrete region contour.

* * * * *